United States Patent
Fancellu et al.

(10) Patent No.: US 11,545,145 B2
(45) Date of Patent: Jan. 3, 2023

(54) MACHINE ACTION BASED ON LANGUAGE-INDEPENDENT GRAPH REWRITING OF AN UTTERANCE

(71) Applicant: SAMSUNG ELECTRONICS CO., LTD., Suwon-si (KR)

(72) Inventors: Federico Fancellu, Toronto (CA); Akos Kadar, Toronto (CA); Ran Zhang, Toronto (CA); Afsaneh Fazly, Aurora (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 127 days.

(21) Appl. No.: 17/080,378

(22) Filed: Oct. 26, 2020

(65) Prior Publication Data
US 2021/0375273 A1     Dec. 2, 2021

Related U.S. Application Data

(60) Provisional application No. 63/031,841, filed on May 29, 2020.

(51) Int. Cl.
  *G10L 15/16*     (2006.01)
  *G10L 15/197*    (2013.01)
  *G06N 3/04*      (2006.01)

(52) U.S. Cl.
  CPC ............ *G10L 15/197* (2013.01); *G06N 3/049* (2013.01); *G10L 15/16* (2013.01)

(58) Field of Classification Search
  CPC ......... G10I 15/197; G06N 3/049; G10L 15/16

USPC ........................................................ 704/232
See application file for complete search history.

(56) References Cited

U.S. PATENT DOCUMENTS

| | | | |
|---|---|---|---|
| 6,418,214 B1 * | 7/2002 | Smythe | H04M 3/56 379/206.01 |
| 10,146,765 B2 | 12/2018 | Medlock et al. | |
| 10,553,210 B2 | 2/2020 | Chung et al. | |

(Continued)

OTHER PUBLICATIONS

A. Bartl and G. Spanakis, "A Retrieval-Based Dialogue System Utilizing Utterance and Context Embeddings," 2017 16th IEEE International Conference on Machine Learning and Applications (ICMLA), 2017, pp. 1120-1125, doi: 10.1109/ICMLA.2017.00011. (Year: 2017).*

(Continued)

*Primary Examiner* — Bharatkumar S Shah
(74) *Attorney, Agent, or Firm* — Sughrue Mion, PLLC

(57) ABSTRACT

An utterance in any of various languages is processed to derive a predicted label using a generated grammar. The grammar is suitable for deriving meaning of utterances from several languages (polyglot). The utterance is processed by an encoder using word embeddings. The encoder and a decoder process the utterance using the polyglot grammar to obtain a machine-readable result. The machine-readable result is well-formed based on accounting for re-entrances of intermediate variable references. A machine then takes action on the machine-readable result. Ambiguity is reduced by the decoder by the well-formed machine-readable result. Sparseness of the generated polyglot grammar is reduced by using a two-pass approach including placeholders which are ultimately replaced by edge labels.

12 Claims, 16 Drawing Sheets

(56) References Cited

U.S. PATENT DOCUMENTS

2016/0342895 A1\* 11/2016 Gao ................... G06N 3/0445
2020/0184278 A1\* 6/2020 Zadeh ................ G06K 9/6264

OTHER PUBLICATIONS

A. Bartl and G. Spanakis, "A Retrieval-Based Dialogue System Utilizing Utterance and Context Embeddings," 2017 16th IEEE International Conference on Machine Learning and Applications (ICMLA), 2017, pp. 1120-1125, doi: 10.1109/ICMLA.2017.00011. (Year: 2017) (Year: 2017).\*

\* cited by examiner

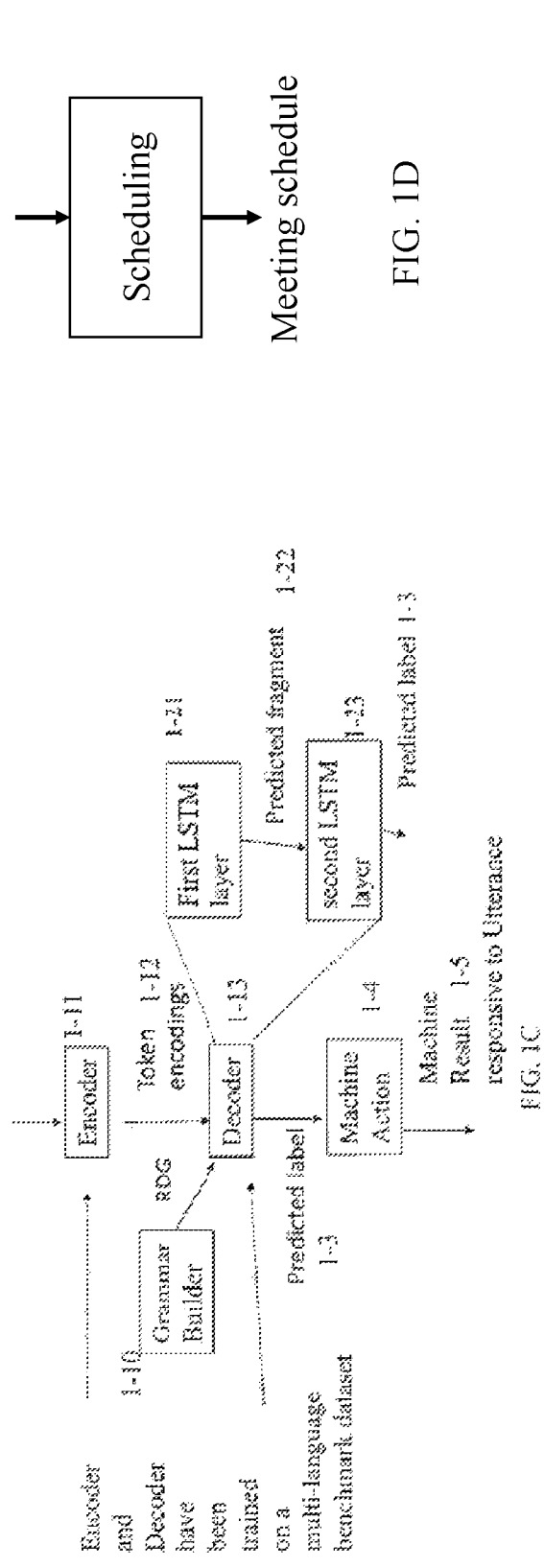

"We barred the door and locked it."

$(b_1/\square$
  :CONTINUATION$_1(b_2/\square$
    :DRS$(e_1$/bar
    :AGENT$(c_1$/speaker)))
    :THEME$(x_1$/door$^p$)))
  :CONTINUATION$_2(b_3/\square$
    :DRS$(e_2$/ lock
    :AGENT $c_1$
    :PATIENT$x_1$))

FIG. 7

The label non-terminal, L, is replaced with a terminal box.

Leftmost non-terminal at step 1 is re-written into a fragment at step 2.

| Step | Production | Result |
|---|---|---|
| 1 | $r_1$ | $(b_1/L\ :CONT\ T_2(\$1,\$2)\ :CONT\ T_2(\$1,\$2))$ |
| 2 | $r_2$ | $(b_1/\square\ :CONT\ (b_2/L\ :DRS\ T_2(\$1,\$2)):CONT\ T_2(\$1,\$2))$ |
| 3 | $r_3$ | $(b_1/\square\ :CONT\ (b_2/\square\ :DRS\ (e_1/L\ :AGENT\ T_1(\$1)\ :THEME\ T_1(\$2))))$ :CONT $T_2(\$1,\$2))$ |
| 4 | $r_4$ | $(b_1/\square\ :CONT\ (b_2/\square\ :DRS\ (e_1/bar\ :AGENT\ (c^*/L)\ :THEME\ T_1(\$2))))$ :CONT $T_2(c,\$2))$ |
| 5 | $r_5$ | $(b_1/\square\ :CONT\ (b_2/\square\ :DRS\ (e_1/bar\ :AGENT\ (c^*/speaker)\ :THEME\ T_1(\$2))))$ :CONT $T_2(c,\$2))$ |
| 6 | $r_2$ | $(b_1/\square\ :CONT\ (b_2/\square\ :DRS\ (e_1/bar\ :AGENT\ (c^*/speaker)\ :THEME\ (x^*/L))))$ :CONT $(b_3/\square\ :DRS\ T_2(c,x)))$ |
| 7 | $r_6$ | $(b_1/\square\ :CONT\ (b_2/\square\ :DRS\ (e_1/bar\ :AGENT\ (c^*/speaker)\ :THEME\ (x^*/door))))$ :CONT $(b_3/\square\ :DRS\ (e_2/lock\ :AGENT\ (c\ :PATIENT\ x))$ |

A most-suitable production is determined at each step until only terminal symbols remain.

FIG. 9

```
Algorithm 1 Extract an RDG from a DAG
 1: procedure GATHER_REENTRANT_SUBNODES(n)
 2:     for child in n.children do
 3:         GATHER_REENTRANT_SUBNODES(child)
 4:     if n.IS_REENTRANT(n) then
 5:         n.reentrants.append({n})
 6:     for child in n.children do
 7:         n.reentrants.append(
           child.reentrants)
 8:
 9: Grammar ← []
10: seen_nodes ← []
11: Derivation ← []
12: procedure EXTRACT_DERIVATION(n)
13:     shared_reentrancies
           ← FIND_SHARED(n.reentrants)
14:     frag ← Fragment
15:     frag.ASSIGN(n.variable)
16:     frag.ASSIGN(n.terminal_labels)
17:     for i ∈ 0..|n| do
18:         Fragment.ASSIGN(n.edge_label(i))
19:         reentrancies_i
             = shared_reentrancies[i]
20:         var_references = CREATE_REFERENCES(
           reentrancies_i)
21:         if c.TRG ∈ seen then
22:             Fragment.ASSIGN(var_references)
23:         else
24:             Fragment.ASSIGN(naked_non_terminal)
25:             Fragment.ASSIGN(var_references)
26:     Grammar.PUSH(frag)
27:     Derivation.PUSH(Grammar.INDEX(frag))
28:     seen_nodes ← n
29:     for child in n.children do
30:         EXTRACT_DERIVATION(child)
```

FIG. 12

MACHINE ACTION BASED ON LANGUAGE-INDEPENDENT GRAPH REWRITING OF AN UTTERANCE

CROSS REFERENCE TO RELATED APPLICATION

This application claims benefit of priority of U.S. Provisional Application No. 63/031,841 filed May 29, 2020, the contents of which are hereby incorporated by reference.

FIELD

The present disclosure is related to a machine action based on a graph-rewriting of an utterance.

BACKGROUND

A problem exists at the human interface with machines. The machine may not obtain the intended meaning of a person, when the machine is asked to do something or given a command.

Making this problem more difficult to practically address, is that people communicate in more than one language. Examples of languages are English, Italian, German and Dutch.

Some workers in the field of communication with machines have studied the grammar of a particular human language. A formalism representing rules applied to the language to come up with a particular sentence or meaning may be programmed into the machine. That is, the machine can interpret requests or commands expressed in the formalism (not English, Italian, etc.). These formalisms may refer to a graph, one graph for each meaning. In some instances, a particular kind of graph is referred to as a tree.

A problem with grammars in general is that two distinct sequences of rules may produce the same utterance. In reverse then, an utterance may be correctly interpreted as indicating two different graphs. For such a grammar, even with correct analysis, the machine may be faced with one utterance and two meanings. This problem is called ambiguity.

SUMMARY

In order to be robust and handle requests or commands in a variety of languages (English, Italian, etc.,), one mapper from language to formalism is needed for each language (English, Italian, etc.). This is a practical problem because different software is needed depending on the language, each piece of software must be maintained through version control, each piece of software occupies memory space, and even execution time is hurt by determining the software to be invoked.

Also, a grammar used to produce a meaning for the machine should avoid ambiguity.

A solution is provided by this application.

The solution constructs a grammar which is useful for many languages. When a processing algorithm is able to process many languages, it is called polyglot.

The solution accepts an utterance in any of several languages, and using the grammar (which is polyglot), the solution determines the meaning of the utterance in a machine-understandable formalism. That is, the solution turns the utterance from any of several languages into a machine-readable message.

The solution formulates the utterance as a graph; some of the graph edges are words of the utterance. Words of the utterance are associated with a set, vector or collection of quantified values, this is called word embedding. Two words of similar meaning have similar vectors and in a general sense point in a similar direction (for example cat and dog). Two words of unrelated meaning have vectors with no similarity and in a general sense do not point in any related direction (for example cat and economy).

The solution re-writes the graph of the utterance as a graph understandable by a machine. Thus, the solution practices a graph-rewriting which performs for any one of several languages. A central aspect of the graph-rewriting is the grammar, thus the grammar may be referred to as language independent.

For robust performance, the grammar must not be large and the machine-readable message should not be ambiguous.

The solution provided herein reduces the size of the polyglot grammar by a two-pass approach. In the first pass, when decoding an utterance, certain identified fragments are replaced by placeholders made available by the polyglot grammar of this application. In the second pass, the placeholders are replaced by what are known as edge values. The use of the first pass reduces the size needed for the polyglot grammar.

The solution reduces ambiguity by requiring that the rules of the grammar produce well-formed phrases, fragments, or sentences. Well-formedness is improved by accounting for variable references. Variable references indicate how many reentrancies are expected in a derivation of the machine-readable message. Ultimate replacement of each variable reference before concluding the derivation of the machine-readable message reduces the possibility of ambiguity.

Provided herein is a method of causing a machine action based on an utterance, the method including: receiving the utterance comprising a plurality of words; associating a plurality of word embeddings with the plurality of words; fine-tuning the plurality of word embeddings to obtain a plurality of tokens, wherein the plurality of tokens includes a plurality of variable references; decoding the plurality of tokens to obtain a machine-readable graph, by requiring a first number of re-entrant graph nodes, wherein the first number is determined by the plurality of variable references; and providing the machine-readable graph to a machine for the machine action.

Also provided herein is a method of causing a machine action based on an utterance, the method comprising: factorizing a plurality of productions, wherein the factorizing comprises replacing a plurality of edge labels in the plurality of products with a plurality of placeholders, and wherein a grammar is defined by the plurality of productions and each respective production of plurality of productions corresponds to a respective rule of a plurality of rules; generating a graph from an utterance, wherein the generating comprises: applying the plurality of rules to obtain a first graph based on the plurality of placeholders, wherein the first graph comprises a second plurality of placeholders, and iteratively replacing, by a neural network and based on a set of constraints, a placeholder in the first graph with an edge label, until each placeholder of the second plurality of placeholders in the first graph has been replaced, thereby obtaining a second graph comprising a second plurality of edge labels and no placeholders.

BRIEF DESCRIPTION OF THE DRAWINGS

The text and figures are provided solely as examples to aid the reader in understanding invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of this invention.

FIG. 1C provides further details of the architecture, including layers of the decoder of FIG. 1B, according to some embodiments.

FIG. 1D illustrates example machine actions.

FIG. 7 illustrates an example directed acyclic graph (DAG) representation for the example utterance.

FIG. 9. illustrates an RDG derivation of the machine-readable meaning from the example utterance. Variable references appear during the derivation and are replaced before the final graph is determined, according to some embodiments.

FIG. 12 illustrates example pseudo-code for extracting a rule (or production) for an RDG by processing a DAG from a data set.

DETAILED DESCRIPTION

Languages are characterized by grammars. In order to discuss grammars in some detail, some description is provided here.

A grammar is a set of rules. Rules are extracted from training data and applied in sequence to produce a graph that represents the meaning of a sentence in a given language A sentence of a language expresses a certain meaning.

The meaning of a sentence can be represented by a graph. The graph may be constructed within the rules of a formalism.

The meaning may be conveyed to a machine by the graph, and without the language.

Thus, many sentences in different languages can be reduced to graphs of a given single formalism, and these graphs have meaning to a machine.

A well-formed graph corresponds to a string with well-formed bracketing and with bounded variable names.

A description of a solution of the application is now provided, particularly referring to FIGS. 1A, 1B, 1C, 2, 3 and 4.

Figure 1A:
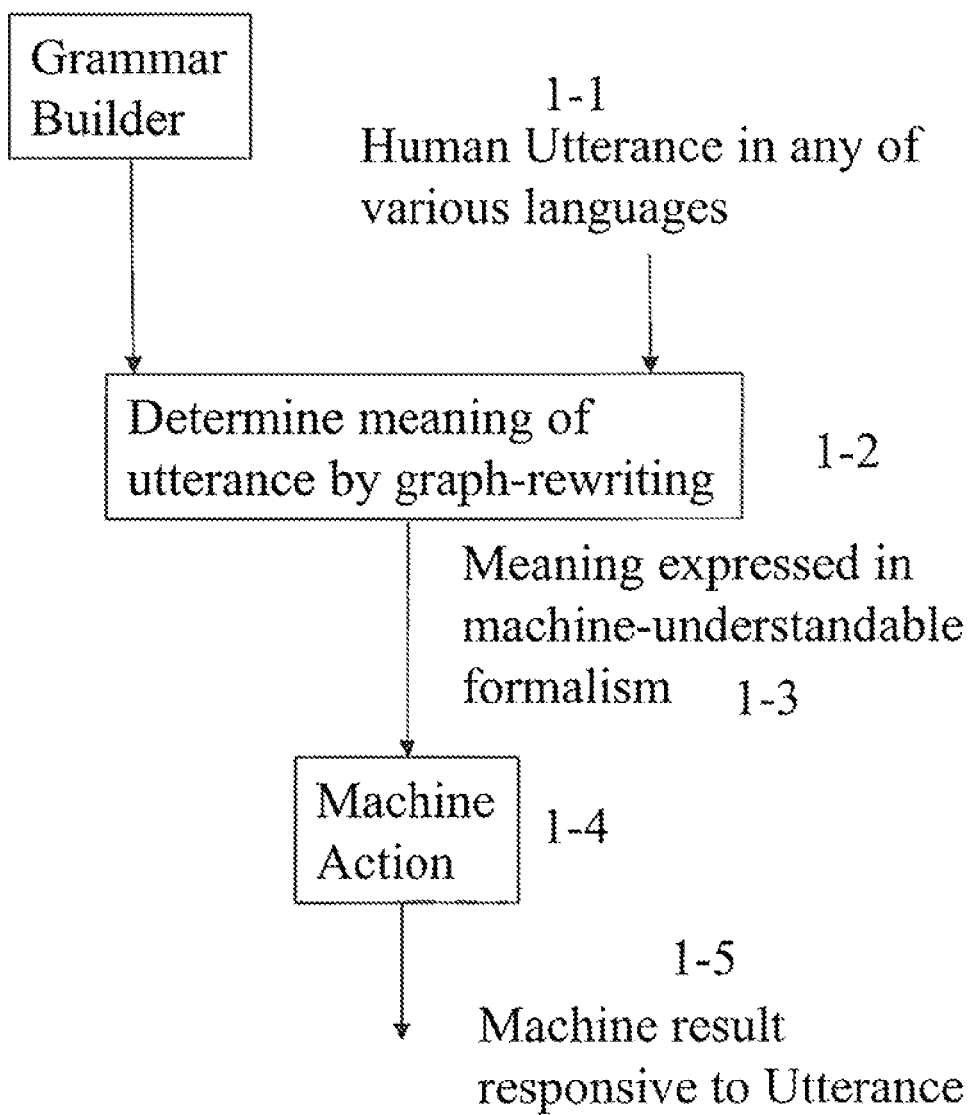
FIG. 1A illustrates an architecture of a solution of the application, including a grammar builder, according to some embodiments.

In FIG. 1A, a grammar builder, item 1-10, is invoked and produces a grammar (RDG). The grammar builder 1-10 is further illustrated in FIG. 2. The grammar builder may be implemented using a processor, memory and instructions, custom hardware, application specific integrated circuit (ASIC), or another approach.

A human utterance in any of various languages, item 1-1, is input along with the grammar to 1-2. Item 1-2 determines the meaning of the utterance by graph-rewriting. The output is a meaning expressed in machine-readable (machine understandable) formalism, item 1-3.

A machine, 1-4, then takes an action producing a machine result 1-5 responsive to the utterance 1-1, the machine action is based on the meaning 1-3.

Figure 1B:
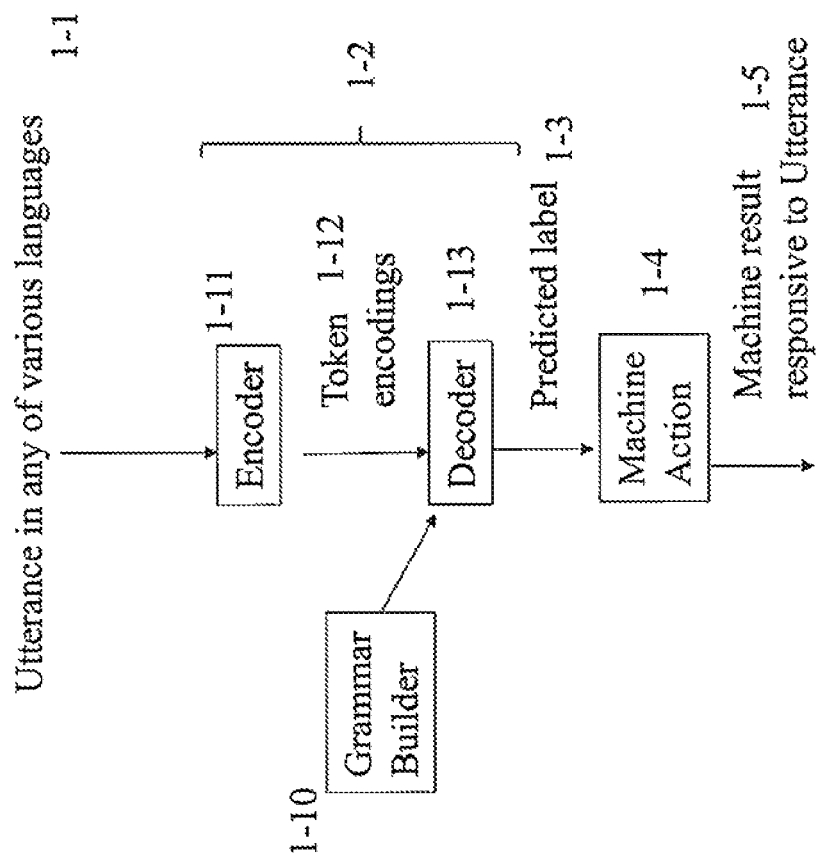
FIG. 1B provides further details of the architecture, including an encoder and decoder, according to some embodiments.

FIG. 1B provides further description of items in FIG. 1A. The item 1-2 of FIG. 1A includes an encoder 1-11 and decoder 1-13 in FIG. 1B. The encoder 1-11 processes the utterance 1-1 and produces token encodings 1-12. The decoder 1-13 processes the token encodings 1-12 and produces a predicted label 1-3. The predicted label is an example of the machine-readable formalism of FIG. 1A.

FIG. 1C provides further description of the decoder 1-13 of FIG. 1B. The decoder 1-13, in some embodiments includes a first LSTM layer 1-21 and a second LSTM layer 1-23. An interior variable, a predicted fragment 1-22 is output by the first LSTM layer 1-21. The second LSTM layer 1-23 produces the predicted label 1-3. FIG. 1C is schematic in nature, and iterations of the decoder to produce the final predicted label 1-3 output and leading to the machine action 1-4 are not shown in FIG. 1C. FIG. 9 shows several steps of the decoder to arrive at a final output predicted label. For simplicity, the decoder output is referred to as 1-3; iterations and steps in which various predicted fragments 1-22 lead to various prediction labels 1-3 are described in detail below (FIG. 9 is the central example for repeated prediction tasks).

FIG. 1C also illustrates that the encoder 1-11 and decoder 1-13 have been trained on a multi-language benchmark dataset before the utterance 1-1 is processed to arrive at the predicted label 1-3.

Figure 2:
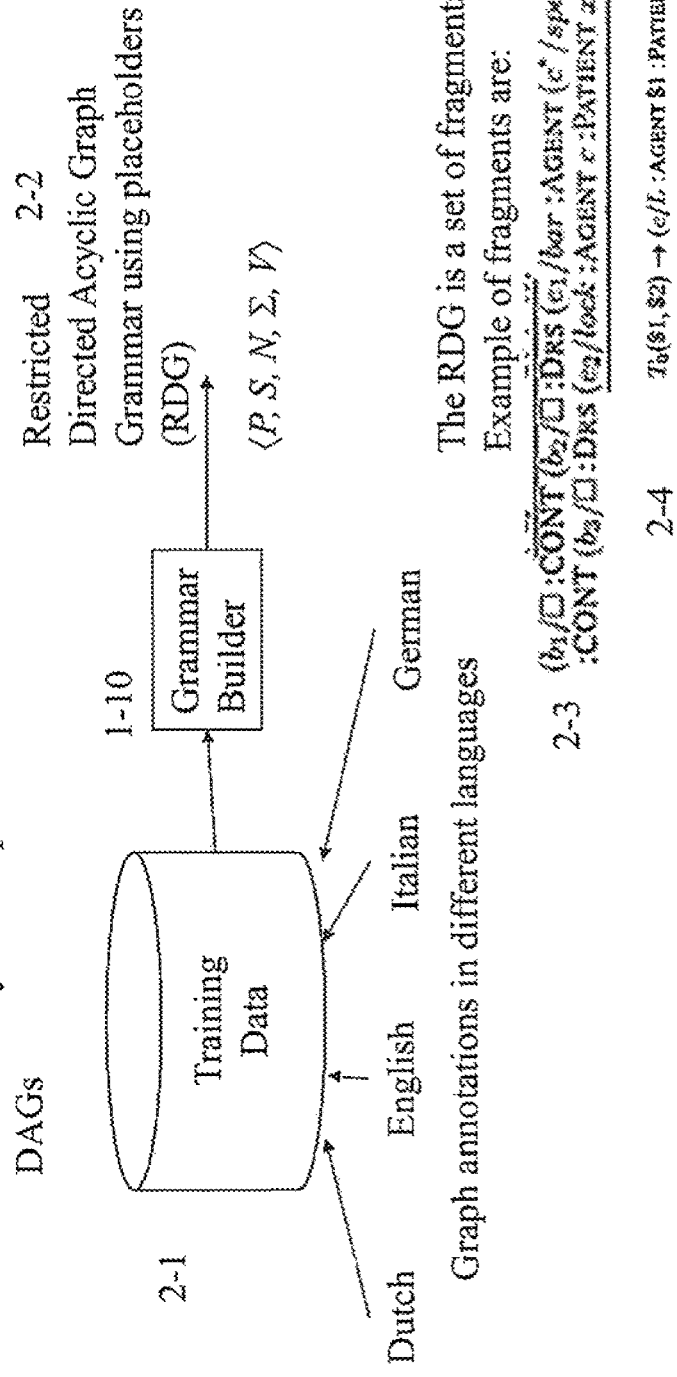
FIG. 2 illustrates building the grammar, including a restricted directed acyclic graph grammar (RDG grammar which is polyglot), according to some embodiments.

FIG. 2 illustrates operation of the grammar builder 1-10 on training data 2-1. The training data 2-1 includes many languages. In an example, the training data 2-1 includes hundreds or thousands of DAGs representing utterances in each of the languages Dutch (sometimes called "NL" for Netherlands), English ("En"), Italian ("It") and German (sometimes called "DE" for Deutsch).

The resulting grammar is a set of information represented as a set or list<P,S,N,$\Sigma$V>. P is a set of productions such as $\alpha \rightarrow \beta$. In FIG. 2, item 2-3 illustrates a fragment which is the result of applying a rule or production. Item 2-4 is an example of a production or rule. "Rule" and "production" have a similar meaning; generally a production includes one or more rules in the context of a grammar to build a sentence or derive the meaning of a sentence. Item 2-5 indicates that "e" is a placeholder symbolically in the grammar of this application. The role of placeholders will be discussed below; examples of placeholders are given in FIG. 9.

Pseudocode for building the polyglot grammar (RDG), ⟨P,S,N,Σ,V⟩, is given in FIG. 12.

Figure 3:
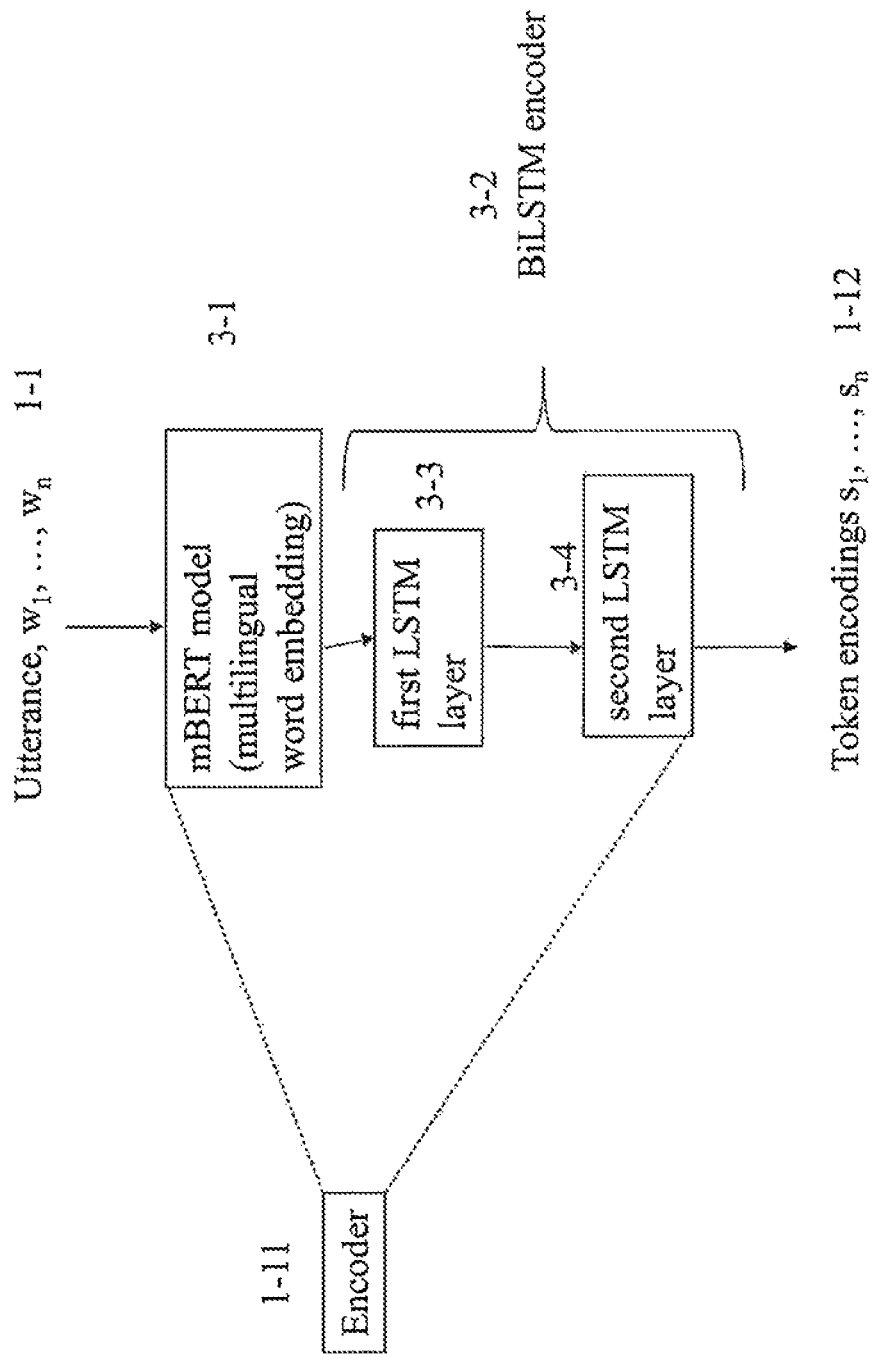
FIG. 3 illustrates further details of the encoder of FIG. 1B, including word embedding and long short term memory (LSTM) layers, according to some embodiments.

FIG. 3 illustrates further details of the encoder 1-11 of FIG. 1B. The encoder may be implemented using a processor, memory and instructions, custom hardware, application specific integrated circuit (ASIC), or another approach.

The encoder 1-11 includes an mBERT model 3-1, and a BiLSTM encoder 3-2. In some embodiments the BiLSTM encoder 3-2 includes a first LSTM layer 3-3 and a second LSTM layer 3-4. The encoder 1-11 processes the utterance (including words $w_1, \ldots, w_n$) and outputs token encodings $s_1, \ldots, s_n$ (item 1-12).

Figure 4:
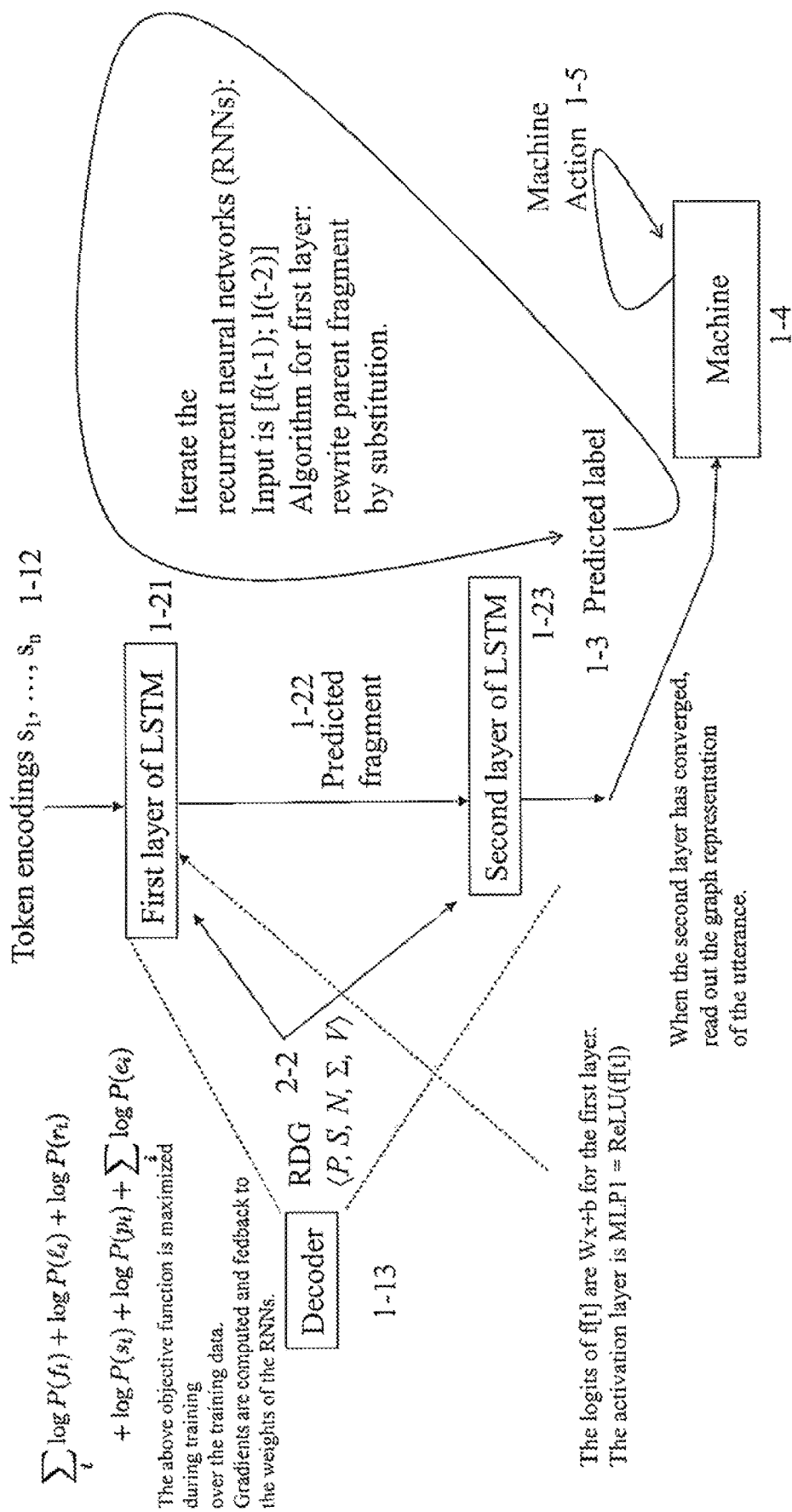
FIG. 4 illustrates further details of operation of the decoder and the resulting machine action based on machine-readable formalism or graph, including use of the RDG grammar (which is polyglot) by LSTM layers at the decoder, passage of the meaning to a machine, and the machine taking action based on the meaning, according to some embodiments.

FIG. 4 illustrates further details of the operation of the decoder 1-13 of FIG. 1B.

RDG 2-2 is used by both the first LSTM layer 1-21 and the second LSTM layer 1-23. Token encodings $s_1, \ldots, s_n$ are processed by layer 1-21. The first layer 1-21 produces a predicted fragment 1-22 by producing logits which then pass through an activation step. The second layer produces a predicted label 1-3. The second layer is operated based on constraints to produce well-formed fragments. The layers are iterated over several prediction tasks. After the predicted label 1-3 only consists of terminal labels, the decoder is done and the result is passed on for machine action 1-4. Further details of operation of the first LSTM layer 1-21 and the second LSTM layer 1-23 are provided below.

FIG. 4 notes that the layers are trained to maximize a probability. Further details of the training are provided below.

Further details of solutions of the application are now provided along with discussion of FIGS. 5, 6, 9 and 12.

Various semantic formalisms are explored in the current computational linguistics literature such as dependency-based compositional semantics, abstract meaning representations, minimum recursion semantics, and discourse representations theory. Despite meaningful differences across formalisms or parsing models, a representation in any of these formalisms can be expressed as directed acyclic graphs (DAG).

Figure 5:
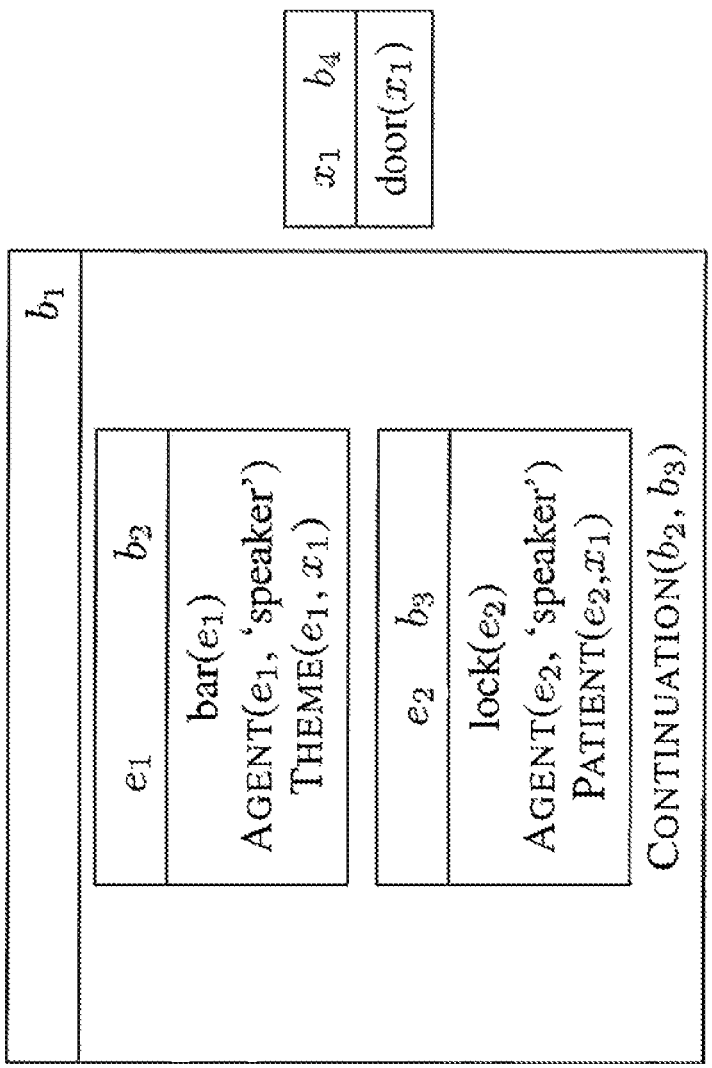
FIG. 5 illustrates an example discourse representation structure (DRS) for an example utterance.

Consider for instance the sentence 'We barred the door and locked it,' whose meaning representation as a Discourse Representation Structure (DRS) is shown in FIG. 5. A DRS is usually represented as a set of nested boxes (e.g. $b_1$) containing variable-bound discourse referents (e.g. 'lock $(e_2)$', semantic constants (e.g. 'speaker'), as well as predicates holding between these (e.g. AGENT) and discourse relations holding between these boxes (e.g. CONTINUATION). All these elements can be easily turned into nodes and edges of a graph to yield the representation in FIG. 6.

Figure 6:
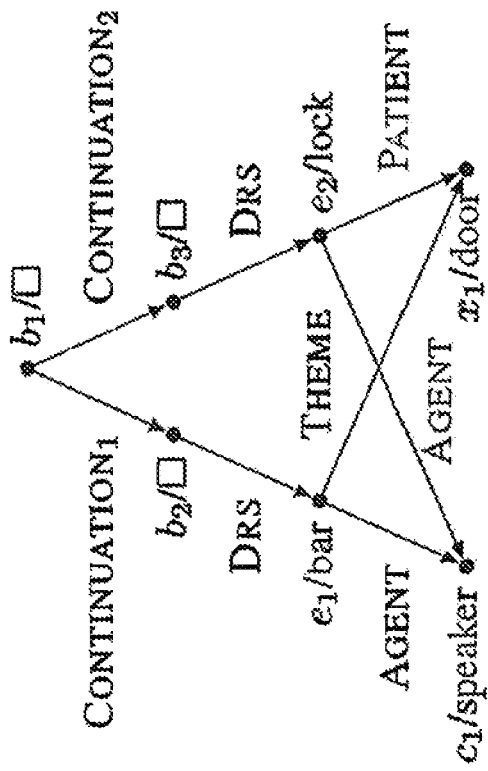
FIG. 6 illustrates an example graph representation for the example utterance.

A popular approach in parsing into graphs is to view them as either string or trees, given the consistency in the linearizations provided by the annotators; an example of such transformation is shown FIG. 6 where the graph in FIG. 7 is represented in PENMAN notion. An advantage of these representations is that they allow for the use of well-understood sequential decoders. However, these structures cannot organically represent reentrant semantic relations such as coordination, co-reference or control. State-of-the-art system scan generate reentrancy, but none of them can guarantee to produce a well-formed rooted DAGs.

Parsing representations directly as graphs can be complex, and it is an active problem in modern formal language theory to discover formalisms that allow to assign probabilities to DAG of practical interest. A successful line of work in modeling graphs make use of graph grammars (in particular, hyperedge replacement grammars) which allow to generate a graph by rewriting non-terminal symbols with graph fragments. Inducing a graph grammar and use for it for parsing is a challenging combinatorial problem; thus, work has looked at first building a syntactic structure the semantic graph can then be built over (similar to Categorical Combinatorial Grammar—CCG).

One embodiment describes a polyglot model for RNN DAG grammars:

Model: One embodiment replaces the stackLSTM with a novel architecture that allows for batch input, while replacing a bidirectional LSTM encoder with a transformer model that relies on word embedding features only. It always guarantees the output graph to be wellformed.

Grammar: One embodiment reduces the size of the DAG grammars by factorizing the prediction of all elements inside a grammar production, i.e. terminal label and edge labels.

Multilinguality: Experiments have verified that the present disclosure can build a truly polyglot model without any additional features beside multilingual word-embeddings.

One embodiment models graph generation as a process of graph rewriting with an underlying grammar. The grammar is a restricted DAG grammar (RDG), a type of context-free grammar designed to model linearized DAGs. An example description of RDG is summarized here using the example in FIG. 6. Also see item 2-2 of FIG. 2.

Figure 8:
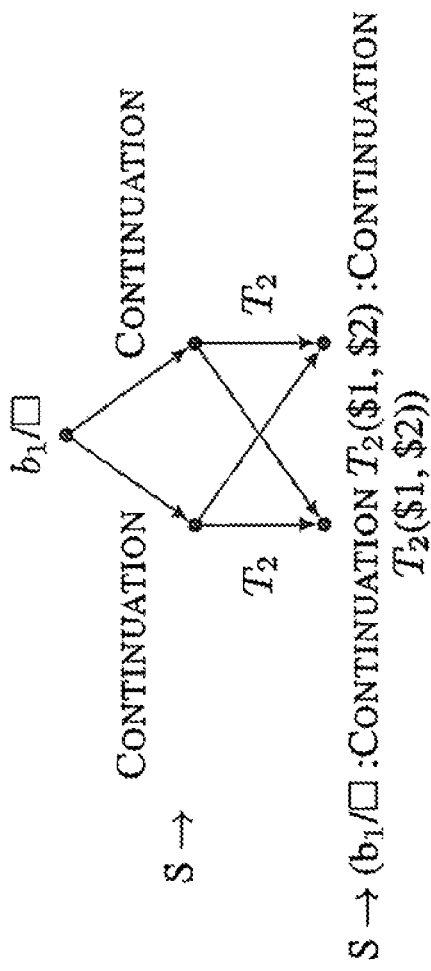
FIG. 8 illustrates an example production (or rule) in a grammar, the example production has a rank and indicates a number of re-entrancies to expect after a use of the production based on a number of variable references.
Figure 10:
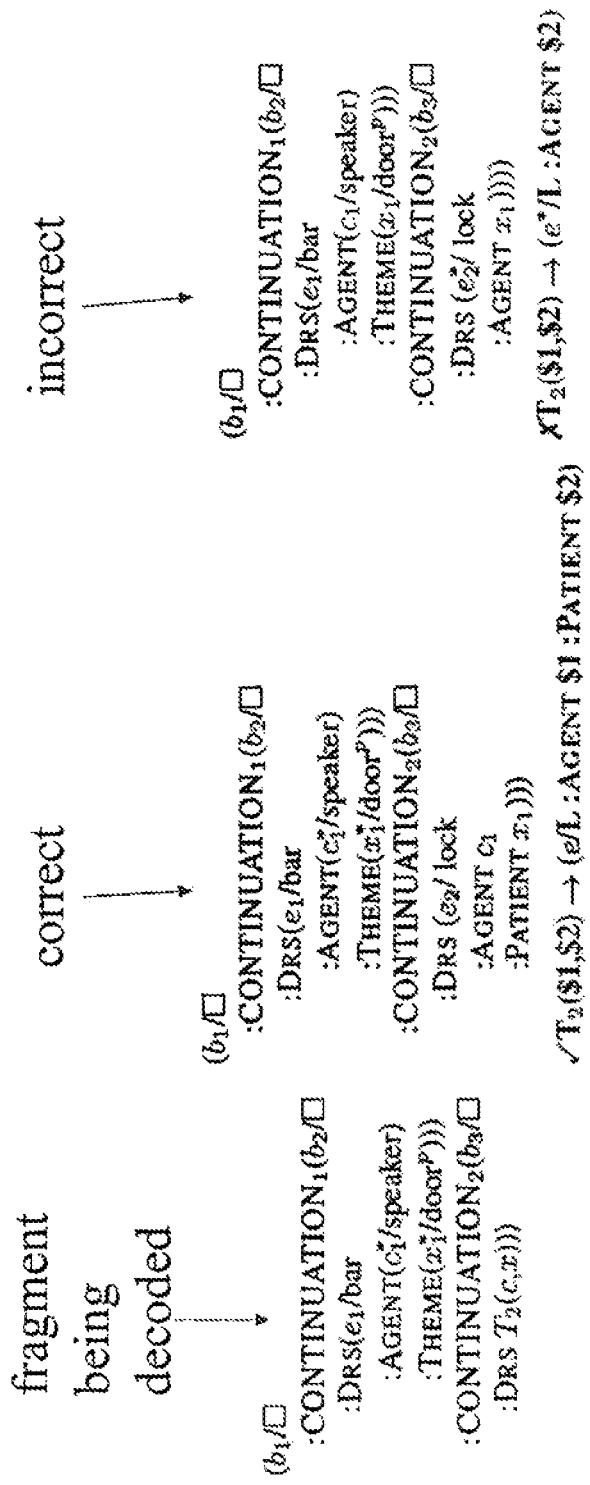
FIG. 10 illustrates a fragment decoding error avoided by the decoding rules of the present application, according to some embodiments.

One embodiment defines an RDG as a tuple ⟨P, S, N, Σ, V⟩ where P are production of the form $\alpha \to \beta$; S is the start symbol; N is the set of non-terminal functions $\{T_0, T_1, T_n\}$ up to a maximum number of n; Σ is the sets of terminal symbols; V is an unbounded set of variable references $\{\$1, \$2, \ldots\}$, whose role is described below. Similar to a CFG-grammar, a production $p \in P$ rewrites a non-terminal to a (hyper)-fragment which can contain both non-terminals and terminals. An example of a production is shown in FIG. 8; given modelling linearized DAGs, a fragment can be rewritten as a string describing a depth-first traversal in PENMAN notation. For the remainder of this description, a string will be used to describe the formalism more compactly, making the connection to sequences more explicit.

The RHS α of a production $p \in P$ is a function $T_i \in N$, where i is the rank, that takes a number of variable references as arguments. Variable references is what ensures the well-formedness of a graph in an RDG by keeping track of how many reentrancies are expected in the derivation as well as how they are connected to their neighboring nodes. In that they function as promises for a reentrant node; for the fragment in FIG. 8, given that there are two variable references, two reentrant nodes can be expected at some point in the derivation. The LHS β is a typed fragment made up of three parts: a variable v describing its type, a label L and a set of tuples ⟨e, s⟩ where e in an edge label from a set of labels E and s is either a non-terminal function T or a variable reference.

If v is the variable of a reentrant node it may replace one of the variable references in α. Otherwise, all variable references in a production must appear at least twice. Hence every variable reference in must appear at least once in α, and variables that do not appear in α must appear at least twice in β.

To illustrate, a complete derivation for the graph in FIG. 6 is shown in FIG. 9, based on the following production (here a production refers to application of a sequence of rules):

S→(b/□ :CONT $T_2$($1, $2) :CONT $T_2$($1, $2))
($r_1$)

$T_2(\$1, \$2) \rightarrow (b/\square :\text{DRS } T_2(\$1, \$2)) (r_2)$ $T_2(\$1, \$2) \rightarrow (e/L :\text{AGENT } T_1(\$1) :T_{HEME} T_1(\$2)) (r_3)$ $T_0(c) \rightarrow (c/L) (r_4)$ $T_0(x) \rightarrow (x/L) (r_5)$ $T_0(\$1, \$2) \rightarrow (e/L :\text{AGENT } \$1 :\text{PATIENT } \$2) (r_6)$ The grammar derives strings by first rewriting the start symbol S, and at each subsequent step rewriting the leftmost function in the partially derived string, with special handling for variable references described below. A derivation is complete when no functions remain.

To begin, the S is replaced by the corresponding fragment in production $r_1$, which contains two non-terminals sharing variable references. This allows to keep track of the variable references when expanding subgraphs along different edges. These variable references are then passed down in the derivation by rewriting the leftmost $T_2(\$1; \$2)$ in step 2. All productions are applied in such way by rewriting the RHS non-terminal function into the corresponding fragment. Variable references are resolved when applying a production that map a variable name to a reference, as shown for production $r_4$, where the variable c is mapped to $1. Variables that can map to references are called external variables and are flagged with an *. Once this mapping is performed, all instances of $1 in the RHS are replaced by the corresponding variable name. In this way, the reference to c is passed down in the rewriting becoming the target of AGENT in $r_6$. Same applies in $r_5$ where x is mapped to $2.

To reduce the size of the grammar, all the fragments are delexicalized. As shown in FIG. 9 such is achieved by the separate non-terminal L that every step gets rewritten in the corresponding terminal label. This also allows to predict fragment and label separately in the model.

One model requires an explicit grammar, according to one embodiment, like the one in r1 . . . r6, which can be obtained by converting each DAG in the training data into a sequence of productions. See FIGS. 2 and 16. The conversion yields a single, unique sequence of productions via a simple linear-time algorithm that recursively decomposes a DAG into subgraphs. See FIG. 9.

FIG. 5: A full RDG derivation for the graph in FIG. 2.

One embodiment encodes the input sentence $w_1, \ldots, w_{|n|}$ using MBERT. See FIG. 3. Only the multilingual word-embedding features produced by MBERT are used; in that, the architecture is polyglot. Each token is segmented into subwords using the WordPiece algorithm and embedding representations are produced for each. These representations have been mean-pooled to produce word-representations $w_1, \ldots, w_n$ that are fed to a two layer BiLSTM. For example, 3-2 of FIG. 3. The concatenation of the forward and backward states for the final token representations $s_1^{enc}, \ldots, s_n^{enc}$ are used. Sometimes these tokens are referred to herein simply as $s_1, \ldots, s_n$.

For decoding strategy, at each step the delexicalized fragment and then the terminal label that substitutes in place of L are first predicted, according to one embodiment. One embodiment includes a two layer LSTM that allows for batched input; this means that there is no representation for each completed fragment that is completed in the derivation. However, experimental results shows that such is not needed.

One embodiment initializes the decoder LSTM with the encoder final states $_n^{enc}$. See the "iterate" notation of FIG. 4. At each step, the network takes as input x, the concatenation of the fragment and its label output at the previous time step $[f_{t-1}; l_{t-1}]$; at t=0, both with a <START> are initialized. Each of the two layer is responsible to predict fragment and terminal label respectively, where the representation of the first is fed into the second.

To predict the fragment at time t, the hidden state of the first layer with the embedding of its parent fragment $u_t$ and a context vector $c_t$ are concatenated. The logits for fragment $f_t$ are predicted with a single linear layer $W^f[c_t^1; f_t^p; h_t^1]+b$. A standard soft attention mechanism is used to compute $c_i^1$, according to one embodiment:

$$c_t^1 = \sum_i^N \alpha_i s_i^{enc} \quad (1)$$

$$a = MLP^1[h_t^1; s_{1:N}^{enc}] \quad (2)$$

$$\alpha_i = \frac{e^{a_i}}{\sum_j a_j} \quad (3)$$

$$MLP^1(x) = \text{ReLU}(Wx + b) \quad (4)$$

To predict the terminal labels L, one embodiment concatenates the hidden state of the second layer, with the embedding of the fragment just predicted $f_t$ and another context vector $c_i^2$, computed in same way as $c_i^1$. Terminal labels in the output graph can either correspond to a lemma in the input sentence (e.g. 'bar', 'lock') or a semantic constant (e.g. 'speaker'). The use of this distinction is made by incorporating a selection mechanism that learns to choose to predict either a lemma from the input or a token from a vocabulary of L.

$$zl_i = [c_t^2; f_t; h_t^2] \quad (5)$$

$$e = W^s[h_{enc}^1; h_{enc}^2; h_{enc}^n] \quad (6)$$

$$l_i = [e; L] z l_i \quad (7)$$

Predicting fragment and terminal labels separately allows for the model to accommodate cases where L contains other lexical features. This is case of the Parallel Meaning Bank (PMB) where each word is annotated for its corresponding synset and information on whether the word is presupposed in the context. To make the system generalizable, a prediction is made by passing $zl_i$ in Eq. 5 through a linear layer $W^{lf}$ to obtain the logits.

Delexicalizing the fragments reduces the size of the grammar and permits factorization of the prediction of fragments and prediction of labels separately. However, DAG grammars can still be large due to the many combinations of how edge labels and their corresponding non-terminals can appear in a fragment. For this reason, one embodiment also predicts edge labels separately by first generating fragments where edge labels are replaced by ordered placeholders $e_1 \ldots e_{|e|}$, as shown below for $r_1$:

$(b/L \; e_1 T_2(\$1;\$2) e_2 T_2(\$1;\$2))(r_1)$

The above is one example, for $r_1$.

The full graph and at each time step store the features used to predict fragments and labels are predicted and then the placeholders $e_i$ are replaced by predicting the corresponding edge label. An experiment is conducted with different combinations of features used for fragment and label-prediction. Additionally, experiments with adding the labels of the parent and child nodes are run. Given the parent $n^p$ and child features $n^c$ a linear function of them is computed: $W^c n^c$; $W^p n^p$. Then the following ways are used to combine them $[W^c n^c; W^p n^p]$, $W^c n^c \bigcirc W^p n^p$, $[[W^c n^c; Wpnp]; |W^c n^c \bigcirc$ $W^p n^p$; $|W^c n^c - W^p n^p|$]. The resulting vectors are then fed to a linear layer. Alternatively, a bilinear layer may also be applied.

In order to ensure a well-formed graph, the fragment that rewrites a non-terminal needs to match its rank. An information about rank is incorporated as a soft-constraint during learning by having the model predicting it at each time step, according to one embodiment. To do so, the same features as fragment prediction that are then passed to a linear layer are used.

Further details discussing FIGS. 5-16 are now provided.

Semantic parses are directed acyclic graphs (DAGs), but in practice most parsers treat them as strings or trees, mainly because models that predict graphs are far less understood. This simplification, however, comes at a cost: there is no guarantee that the output is a well-formed graph. A recent work by Fancellu et al. (Federico Fancellu, Sorcha Gilroy, Adam Lopez, and Mirella Lapata. 2019. Semantic graph parsing with recurrent neural network DAG grammars. In Proceedings of the 2019 Conference on Empirical Methods in Natural Language Processing and the 9th International Joint Conference on Natural Language Processing, pages 2769-2778, hereinafter "Fancellu" or "Fancellu et al," "Fancellu 2019" or "FA19") addressed this problem by proposing a graph aware sequence model that utilizes a DAG grammar to guide graph generation. The present disclosure significantly improves upon this work, by proposing a simpler architecture as well as more efficient training and inference algorithms that can always guarantee the well-formedness of the generated graphs. Importantly, unlike Fancellu et al., the model does not require language-specific features, and hence can harness the inherent ability of DAG-grammar parsing in multilingual settings. The present disclosure performs monolingual as well as multilingual experiments on the Parallel Meaning Bank. The parser outperforms previous graph-aware models by a large margin, and closes the performance gap between string-based and DAG-grammar parsing.

Semantic parsers map a natural language utterance into a machine-readable meaning representation, thus helping machines understand and perform inference and reasoning over natural language data. Various semantic formalisms have been explored as the target meaning representation for semantic parsing, including dependency-based compositional semantics, abstract meaning representation, minimum recursion semantics, and discourse representation theory. Despite meaningful differences across formalisms or parsing models, a representation in any of these formalisms can be expressed as a directed acyclic graph (DAG).

Consider for instance the sentence 'We barred the door and locked it', whose meaning representation as a Discourse Representation Structure (DRS) is shown in FIG. 5. A DRS is usually represented as a set of nested boxes (e.g. b1), containing variable-bound discourse referents (e.g. 'lock (e2)'), semantic constants (e.g. 'speaker'), predicates (e.g. AGENT) expressing relations between variables and constants, and discourse relations between the boxes (e.g. CONTINUATION). This representation can be expressed as a DAG by turning referents and constants into vertices, and predicates and discourse relations into connecting edges, as shown in FIG. 6.

Commonly-adopted approaches to parse a sentence into a DAG view graphs as strings, or trees, taking advantage of the linearized graph representations provided in annotated data. An advantage of these linearized representations is that they allow for the use of well-understood sequential decoders and provide a general framework to parse into any arbitrary formalism. However, these representations cannot organically represent reentrant semantic relations, such as coordination, co-reference, and control, that are widespread in language. State-of-the-art string-based parsers, although able to generate reentrancy in their output, cannot guarantee well-formed DAGs.

Parsing directly into DAGs, although desirable, is less straightforward than string-based parsing. Whereas probabilistic models of strings and trees are ubiquitous in NLP, at present, it is an active problem in modern formal language theory to develop formalisms that allow to define probability distributions over DAGs of practical interest.1 A successful line of work derives semantic graphs using graph grammars that allow to generate a graph by rewriting non-terminal symbols with graph fragments.

Among these, hyperedge replacement grammar (HRG) has been explored for parsing into semantic graphs. However, parsing with HRGs is not practical due to its complexity and large number of possible derivations per graph. Thus, work has looked at ways of constraining the space of possible derivations, usually in the form of alignment or syntax. Other works include hand-crafted grammars whose productions are aligned to the input sentence and combined over a latent dependency-like structure. Some works draw on constituent parses to combine together HRG fragments. Some works show that there exists a restricted subset of HRGs, Restricted DAG grammar (RDG), that provides a unique derivation per graph. A unique derivation means that a graph is generated by a unique sequence of productions, which can then be predicted using sequential decoders, without the need of an explicit alignment model or an underlying syntactic structure. Furthermore, the grammar places hard constraints on the rewriting process, which can be used to guarantee the well-formedness of output graphs during decoding. Drawing on this result, Fancellu et al. (2019) introduces recurrent neural network RDGs, a sequential decoder that models graph generation as a rewriting process with an underlying RDG. However, despite the promising framework the approach in FA19 falls short in several aspects.

This application addresses these shortcomings, and proposes an accurate, efficient, polyglot model for Neural RDG parsing. Contributions include the following.

Grammar: In practice, RDGs extracted from training graphs can be large and sparse. The present disclosure shows a novel factorization of the RDG production rules that reduces the sparsity of the extracted grammars. Furthermore, the present disclosure makes use of RDGs extracted on fully human annotated training data to filter out samples from a larger noisy machine-generated dataset that cannot be derived using such grammars. The present disclosure finds that this strategy not only drastically reduces the size of the grammar, but also improves the final performance.

Model: FA19 use a syntactic parsing inspired architecture, a stackLSTM, trained on a gamut of syntactic and semantic features. The present disclosure replaces this with a novel architecture that allows for batched input, while adding a multilingual transformer encoder that relies on word-embedding features only.

Constrained Decoding: The present disclosure identifies a limitation in the decoding algorithm presented by FA19, in that it only partially makes use of the wellformedness constraints of an RDG. The present disclosure describes the source of this error, implements a correction and shows that the present disclosure can guarantee well-formed DAGs.

Multilinguality: Training data in languages other than English can be small and noisy. FA19 addressed this issue with cross-lingual models using features available only for a small number of languages, but did not observe improvements over monolingual baselines in languages other than English. The present disclosure instead demonstrates the flexibility of RDGs by extracting a joint grammar from graph annotations in different languages. At the same time, the present disclosure makes full use of the multilingual encoder to build a polyglot model that can accept training data in any language, allowing us to experiment with different combinations of data. The results tell a different story where models that use combined training data from multiple languages always substantially outperform monolingual baselines.

Approaches of embodiments are tested on the Parallel Meaning Bank, a multilingual graphbank. The experimental results demonstrate that the new model outperforms that of FA19 by a large margin on English while fully exploiting the power of RDGs to always guarantee a wellformed graph. Embodiments also show that the ability of simultaneously training on multiple languages substantially improves performance for each individual language. Importantly, Embodiments close the performance gap between graph-aware parsing and state-of-the-art string-based models.

Restricted DAG Grammar

Embodiments model graph generation as a process of graph rewriting with an underlying grammar. The grammar is a restricted DAG grammar (RDG), a type of context-free grammar designed to model linearized DAGs. For ease of understanding, embodiments represent fragments in grammar productions as strings. An example is shown in FIG. 8, where the right-hand-side (RHS) fragment can be represented as its left-to-right linearization, with reentrant nodes flagged by a dedicated $ symbol. FIG. 8 illustrates an example production for a grammar. The graph fragment on the right-hand side can be replaced with a string representing its depth-first traversal.

An RDG is a tuple $\{P,N,SIGMA, S,V\}$ (item 2-2, FIG. 2) where P is a set of productions of the form $\alpha \to \beta$; N is the set of non-terminal functions $\{L, T0, \cdots, Tn\}$ up to a maximum number of n; $\Sigma$ is the set of terminal symbols; S is the start symbol; V is an unbounded set of variable references $\{\$1, \$2, \ldots\}$, whose role is described below.

The left-hand-side (LHS) $\alpha$ of a production p which belongs to the set P is a function Ti which belongs to the set N (where i is the rank) that takes i variable references as arguments. Variable references are what ensure the well-formedness of a generated graph in an RDG, by keeping track of how many reentrancies are expected in a derivation as well as how they are connected to their neighboring nodes. Rank, in turn, is an indication of how many reentrancies are present in a graph derivation. For instance, in the graph fragment in FIG. 8, given that there are two variable references and a non-terminal of rank 2, two reentrant nodes are expected at some point in the derivation. The RHS $\beta$ is a typed fragment made up of three parts: a variable v describing the type, a label non-terminal L, and a list of tuples<e,s> where e is an edge label from a set of labels E and s is either a non-terminal function T or a variable reference. The non-terminal L can only be rewritten as a terminal symbol 1 which is an element of the set $\Sigma$. If a node is reentrant, embodiments mark it with a * with v. Variable references are percolated down the derivation and replaced once a reentrant variable v* is found on the RHS.

An example of a complete derivation is provided in FIG. 9. FIG. 9 reconstructs the graph in FIG. 6. The grammar derives strings by first rewriting the start symbol S, a non-terminal function T0. At each subsequent step, the leftmost non-terminal function in the partially derived string is rewritten, with special handling for variable references described below. A derivation is complete when no non-terminals remain. Variable references are resolved when applying a production that maps a reentrant variable name to a reference, as shown for production RULE 4, where the variable c is mapped to $1. Once this mapping is performed, all instances of $1 in the RHS are replaced by the corresponding variable name. In this way, the reference to c is kept track of during the derivation becoming the target of AGENT in $r_6$.

Same applies in $r_5$ where x is mapped to $2.

All the fragments are delexicalized. This is achieved by the separate non-terminal L that at every step is rewritten in the corresponding terminal label (e.g. bar). Delexicalization allows to reduce the size of grammar and factorize the prediction of fragments and labels separately.

However, DAG grammars can still be large due to the many combinations of how edge labels and their corresponding non-terminals can appear in a fragment. For this reason, in embodiments provided herein, edge labels are replaced with placeholders $ehat_1, \ldots, ehat_{|e|}$ (where|Ehat| is the size of the set Ehat), which embodiments exemplify using the production in FIG. 8 as follows:

$$S \to (b_1/L\hat{e}_1 T_2(\$1,\$2)\hat{e}_2 T_2(\$1,\$2))$$

3 Architecture

In some embodiments, a model of this application is an encoder-decoder architecture, see FIG. 1B, that takes as input a sentence and generates a DAG G as a sequence of fragments with their corresponding labels, using the rewriting system in § 2, see FIGS. 3-4. Embodiments obtain the logits for each target prediction, all of which are normalized with the softmax function to yield probability distributions.

Figure 11A:
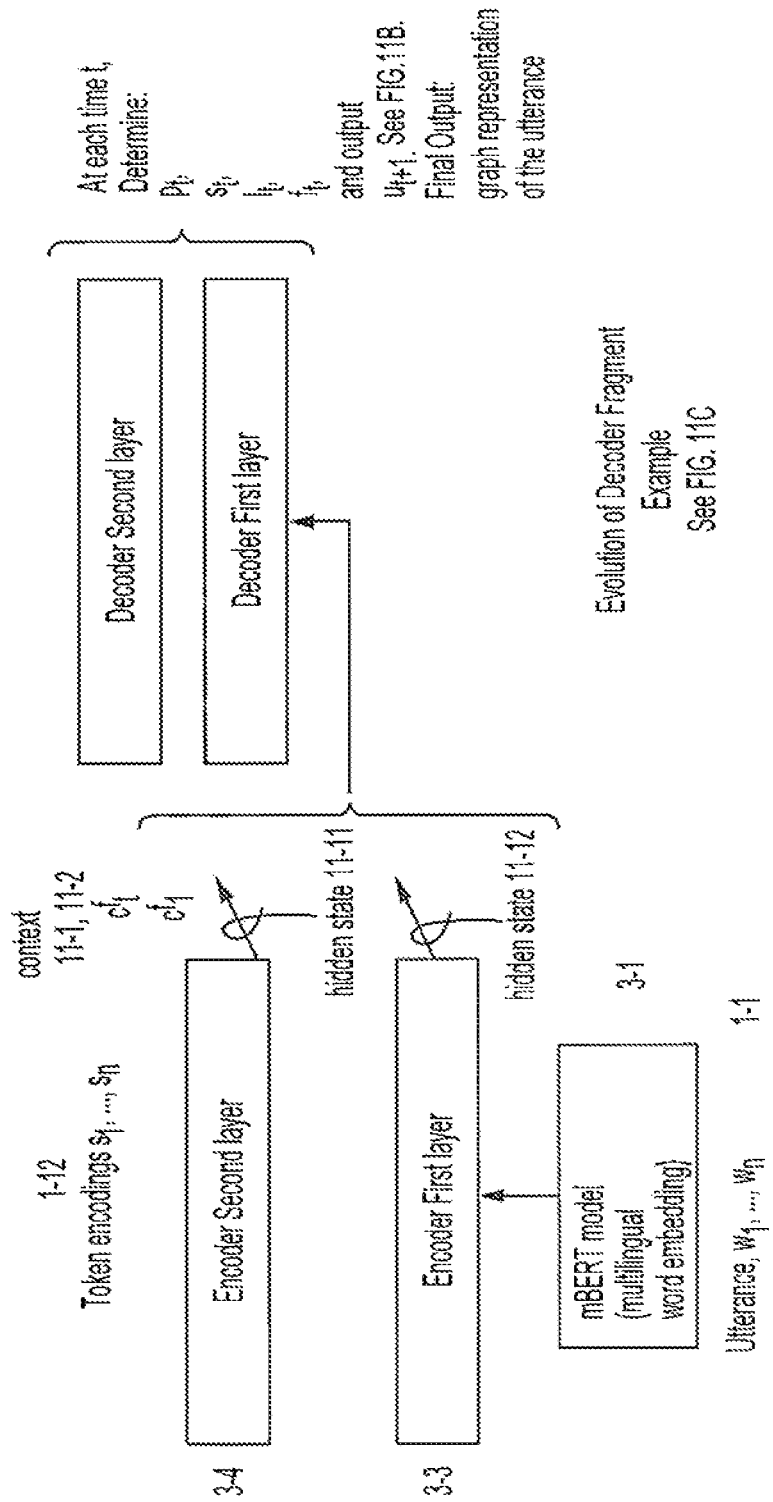
FIG. 11A, FIGS. 11B, and 11C illustrate example states and steps of the encoder and decoder during the derivation of the machine-readable message for the example utterance, according to some embodiments.
Figure 11B:
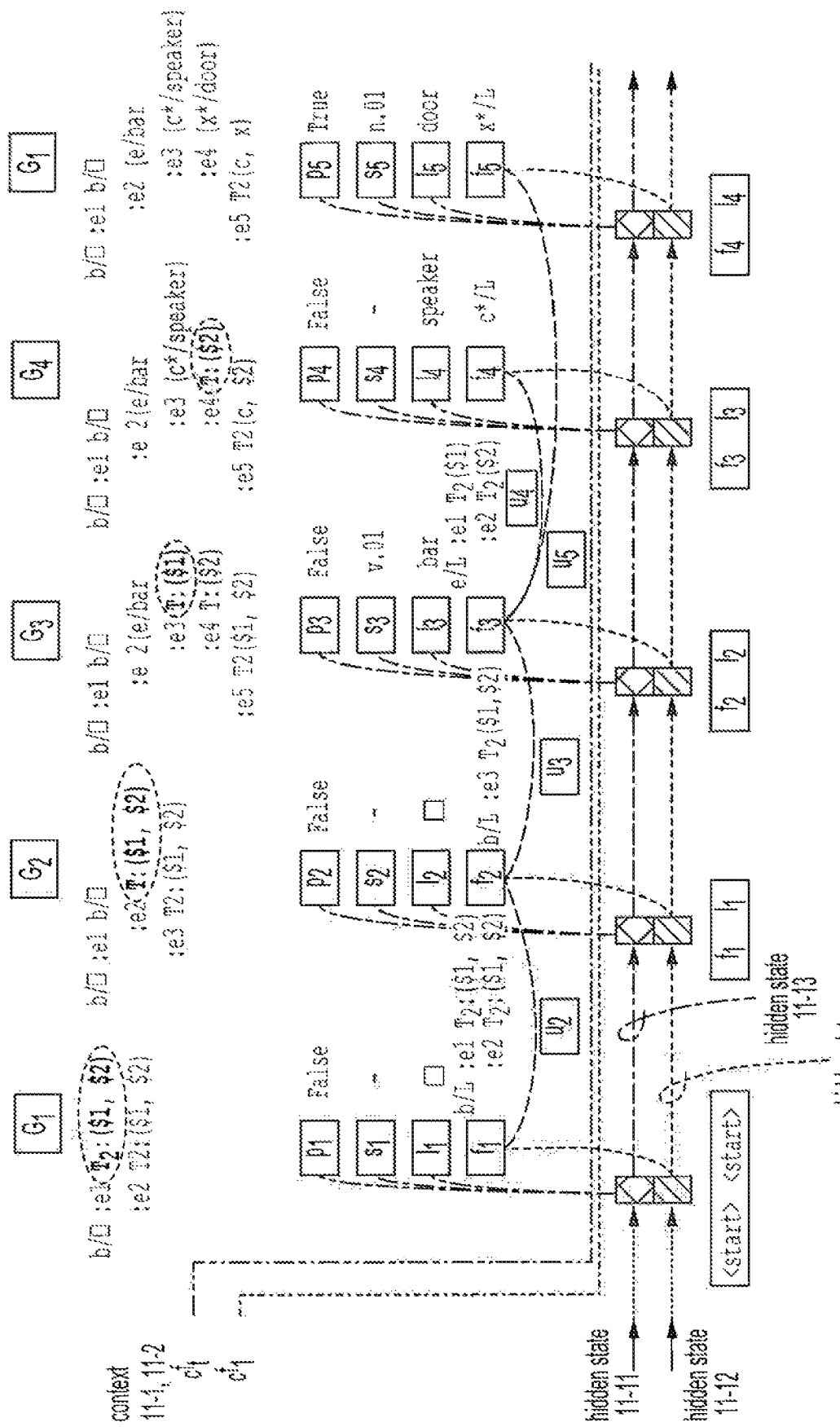
Figure 11C:
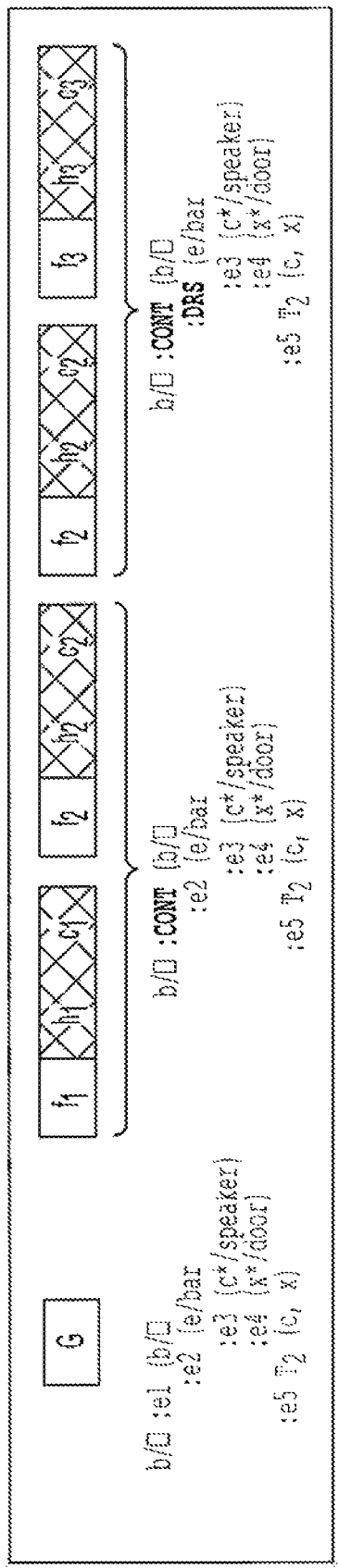

A detailed diagram of the architecture is shown in FIGS. 11A, 11B and 11C.

3.1 Encoder, Item 1-11.

An overview of the architecture is as follows.

The encoder encodes multilingual word-embedding using MBERT which then feed into the 2-layer BiLSTM. At the time step t, a 2 layer decoder LSTM reconstructs a graph G by predicting fragment $f_t$ and terminal label $l_t$. Parsing on PMB requires predicting for each label $l_t$ a sense tag $s_t$ and presupposition information $p_t$ (a Boolean flag). To predict $f_t$, the hidden state of the decoder first layer (item 11-14) along with context vector $c_t^f$ (item 11-1) and information about the parent fragment $u_t$. All other predictions are done using the hidden state of the decoder second layer (item 11-13) along a separate context vector $c_t^1$ (item 11-2).

Both context vectors are computed using soft attention over the input representation (token encodings).

Fragments predicted are used to substitute the leftmost non-terminal (marked with ellipses in upper portion of FIG. 11B) in the partial graph G, as shown near the top of FIG. 11B for $G_2$, $G_3$, $G_4$ and $G_5$. For G1 the first fragment predicted initializes the graph (this corresponds to substituting the start symbol S). The edge labels in the fragments above are replaced with placeholders $e_1, \ldots e_{|e|}$ to display how edge factorization works. In the Example of FIG. 11B and FIG. 11C, $G_5$ is the final output graph. The prediction of two edges that substitute in place of placeholders is shown in FIG. 11C. For edge prediction, embodiments use a bundle of features collected during decoding, namely the parent and children fragment embedding $f_t$, the second layer hidden state 11-13 and the context vector $c_t^1$ (at time t).

Additional general description is given below of the processes of FIGS. 11A, 11B and 11C.

Embodiments encode the input sentence (utterance 1-1) $w_1, \ldots, w_{|n|}$ using a pre-trained multilingual BERT (mBERT) model (Devlin et al., 2018).3 The final word-level representations are obtained through mean-pooling the subword representations of mBERT computed using the Wordpiece algorithm (Schuster and Nakajima, 2012). Embodiments do not rely on any additional (language-specific) features, hence making the encoder polyglot. The word vectors are then fed to a two-layer BiLSTM encoder, whose forward and backward states are concatenated to produce the final token encodings, $s_1, \ldots, s_n$, also referred to herein as $s_1^{enc}, \ldots, s_n^{enc}$.

3.2 Decoder, Item 1-13.

The backbone of the decoder is a two layer LSTM, with two separate attention mechanisms for each layer. The decoding strategy follows steps similar to those in FIG. 5. At each step embodiments first predict a delexicalized fragment $f_t$, and substitute a terminal label lt in place of L. Embodiments initialize the decoder LSTM with the encoder's final state $s_n^{enc}$.

As a brief aside, the expression "delexicalized" is explained here by an example. When rules are extracted from training data, each rule is anchored to particular word in a sentence. For instance '(I) bar (the door)' and '(I) lock (the door)' will yield the rules 'e-bar:Agent x :Patient y' and 'e-lock :Agent x :Patient y', meaning that for both actions there is someone doing the action and something being the target of it. Note that if the word "bar" or the word "lock" are disregarded, these rules are the same. So to reduce the number of rules extracted, a placeholder ("e-word") is used for "bar" or "lock". Then processing can extract a delexicalized rule 'e-word :Agent x : Patient y'. Rules with the same semantic value are then grouped together, in some cases as one rule, reducing sparsity of the grammar. Algorithmically, the actual word is predicted replace e-word in a second stage. In the decoder disclosed herein, this two-step predictions is represented by the fragment and the label prediction respectively.

At each step t, the network takes as input $[f_{t-1}; l_{t-1}]$, the concatenation of the embeddings of the fragment and its label output at the previous time step. At t=0, embodiments initialize both fragment and label encodings with a ⟨START⟩ token. The first layer in the decoder, item 1-21, is responsible for predicting fragments. The second layer, item 1-23, takes as input the output representations of the first layer, and predicts terminal labels. The following paragraphs provide details on the fragment and label predictions.

Fragment prediction. Embodiments make the prediction of a fragment dependent on the embedding of the parent fragment and the decoder history. Embodiments define as parent fragment the fragment containing the non-terminal the current fragment is rewriting; for instance, in FIG. 5, the fragment in step 1 is the parent of the fragment underlined in step 2. Following this intuition, at time t, embodiments concatenate the hidden state of the first layer $h_t^1$ with a context vector $c_t^1$ and the embedding of its parent fragment $u_t$. The logits for fragment $f_t$ are predicted with a single linear layer $W^f [c_t^1; u_t; h_t^1]+b$. Embodiments compute $c_t^1$ using a standard soft attention mechanism as follows, where $s^{enc}_{1:N}$ represents the concatenation of all encoding hidden states.

Equations 1-4, presented above, are repeated here for convenience.

$$c_t^1 = \sum_{i}^{N} \alpha_i s_i^{enc} \quad (1)$$

$$a = MLP^1 [h_t^1; s_{1:N}^{enc}] \quad (2)$$

$$\alpha_i = \frac{e^{a_i}}{\sum_j a_j} \quad (3)$$

$$MLP^1(x) = \text{Re}LU(Wx + b) \quad (4)$$

Label prediction. Terminal labels in the output graph can either correspond to a lemma in the input sentence (e.g. 'bar', 'lock'), or to a semantic constant (e.g. 'speaker'). Embodiments make use of this distinction by incorporating a selection mechanism that learns to choose to predict either a lemma from the input or a token from a vocabulary of L. Embodiments concatenate the hidden state of the second layer $h_t^2$ with the embedding of the fragment predicted at the current time-step $f_t$ and the second layer context vector $c_t^2$.

In FIG. 9, steps $f_t$ occur to identify one rule application, this represents one pass through the two decoder LSTM layers.

Let us refer to this representation as $z_t=[f_t; h_t^2; c_t^2]$. The context vector for the second layer is computed in the same way as $c_t^1$, but using $h_t^2$ in place of $h_t^1$ and separate attention MLP parameters. To compute the logits for label prediction embodiments apply a linear transformation to the encoder representations $e=W_s s^{enc}_{1:N}$. Embodiments concatenate the resulting vector with the label embedding matrix L and compute the dot product $z_t^T [e;L]$ to obtain the final unnormalized scores jointly for all tokens in the input and L.

In the PMB, each label is also annotated with its sense tag and information about whether it is presupposed in the context or not. Embodiments predict the former, $s_t$, from a class of sense tags S extracted from the training data, and the latter, $p_t$, a binary variable, by passing $z_t$ two distinct linear layers to obtain the logits for each.

In general, logits are conditional probability measures used to build up an overall probability score. Selecting the final production chosen at the time t in the percolation of FIG. 9 is a prediction task. The overall probability score is used to select which production is the final chosen production employed at the time t in the percolation sequence shown in FIG. 9. For example, at t=2, r2 is chosen in FIG. 9. At t=7, r6 is chosen.

Edge factorization. In § 2, embodiments are discussed making grammars less sparse by replacing the edge labels in a production fragment with placeholders. From a modelling perspective, this allows to factorize edge label prediction, where the decoder first predicts all the fragments in the graph and then predicts the edge labels $e_i \ldots e_{|e|}$ that substitute in place of the placeholders.

To do so, embodiments cache the intermediate representations $z_t$ over time. Embodiments use these as features, to replace the edge-placeholders ehat$_i$ with the corresponding true edge labels $e_i$. To obtain the edge-label logits embodiments pass the second-layer representation for the child fragment $z^c$ and parent fragment $z^p$ to a pairwise linear layer: $W^e[W^c z^c (\cdot) W^p z^p]$ where $(\cdot)$ (circle with a dot in the middle) is used to indicate element-wise multiplication as is well known in machine-learning applications.

3.3 Graph-Aware Decoding

At inference time, the graph decoder, element 1-13, rewrites nonterminals left-to-right by choosing the fragment with the highest probability, and then predicts terminal and/or edge labels. The rank of a non-terminal and the variable references it takes as arguments place a hard constraint on the fragment that rewrites in its place (as shown in § 2). Only by satisfying these constraints, the model can ensure wellformedness of generated graphs. By default, the decoder does not explicitly follow these constraints and can substitute a nonterminal with any fragment in the grammar. This is to assess whether a vanilla decoder can learn to substitute in a fragment that correctly matches a non-terminal. On top of the vanilla decoder, embodiments then exploit these hard constrains in two different ways, as follows.

Rank prediction. Embodiments incorporate information about rank as a soft constraint during learning, see annotation of the decoder 1-13 in FIG. 4, by having the model predict it at each time step. This means that the model can still predict a fragment whose rank and variable references do not match those of a non-terminal but it is guided not to do so. For rank prediction, embodiments use the same features as fragment prediction that embodiments then pass to a linear layer: $r_t = W^r[c_t^1; u_t; h_t^1] + b^r$.

2. The decoder runs in a deterministic fashion over a number of steps. At each time step, the decoder takes the graph fragment that has the best likelihood given the input sentence and what has been generated so far.

Specifically, this application discloses constrained decoding. Embodiments explicitly require the model to choose only amongst those fragments that can match the rank and variable references of a non-terminal. This may override model predictions but always ensures that a graph is well-formed. To ensure well-formedness, FA19 only checks for rank. The previous method, not part of this solution provided herein, can lead to incorrect results. Consider for instance the substitution in FIG. 10. Both fragments at the bottom of the middle and right representations are of rank 2 but whereas the first allows for the edges to refer back to the reentrant nodes, the second introduces an extra reentrant node, leaving therefore one of the reentrant nodes disconnected. Checking just for rank is therefore not enough; one also needs to check whether a reentrant node that will substitute in a variable reference has already been generated. If not, any fragment of the same rank can be accepted. If such a node already exists, only fragments that do not introduce another reentrant node can be accepted.

This constrained decoding strategy is what allows us to increase the likelihood of generating well-formed graphs; embodiments integrate this validation step in the decoding algorithm when selecting the candidate fragment, thus avoiding an incorrect rule application in the derivation of meaning 1-3 for the machine action 1-4. Finally, embodiments integrate these hard constraints in the softmax layer as well. Instead of normalizing the logits across all fragment types with a single softmax operation, embodiments normalize them separately for each rank. The errors are only propagated through the subset of parameters in $W^f$ and $b^f$ responsible for the logits within the target rank $r_t$.

3.4 Training Objective

The objective is to maximize the log-likelihood of the full graph P(G|s) approximated by the decomposition over each prediction task separately. Equation 5 was given above, and is provided here again for convenience.

$$\sum_t \log P(f_t) + \log P(l_t) + \log P(r_t) + \log P(s_t) + \log P(p_t) + \sum_i \log P(e_i) \quad (5)$$

where $f_t$ is the fragment; $l_t$ is the label; $r_t$ is the (optional) rank of $f_t$; $s_t$ and $p_t$ are the sense and presupposition label of terminal label $l_t$; $e_i \ldots e_{|e|}$ are the edge labels of $f_t$. To prevent the model from overfitting, rather than directly optimizing the log-likelihoods, embodiments apply label smoothing for each prediction term.

4 Experimental Setup
4.1 Data

Embodiments evaluate the parser on the Parallel Meaning Bank, a multilingual graph bank where sentences in four languages (English (en), Italian (it), German (de) and Dutch (nl)) are annotated with their semantic representations in the form of Discourse Representation Structures (DRS). Embodiments test on v.2.2.0 to compare with previous work, and present the first results on v.3.0 on all four languages. Embodiments also provide results when training on both gold and silver data, where the latter is approximately ten times larger but contains machine-generated parses, of which only a small fraction has been manually edited. Statistics are shown in Table 1 below.

TABLE 1

Statistics for the grammars extracted from the PMB (g—gold; s—silver).

| | # training instances | # fragments + edge label | # fragments − edge label | avg. rank |
|---|---|---|---|---|
| PMB2.2.0-g | 4585 | 1196 | 232 | 1.56 |
| PMB2.2.0-s | 63960 | 17414 | 2586 | 2.85 |
| PMB3-g | 6618 | 1695 | 276 | 2.22 |
| PMB3-s | 94776 | 36833 | 6251 | 3.01 |
| PMB3-it | 2743 | 1827 | 378 | 2.32 |
| PMB3-de | 5019 | 4025 | 843 | 2.61 |
| PMB3-nl | 1238 | 1338 | 318 | 2.29 |

Additional statistics for both versions of the PMB are illustrated in FIG. 13 (Table 5).

The model requires an explicit grammar which embodiments obtain by automatically converting each DAG in the training data into a sequence of productions. This conversion follows the one in FA19 with minor changes; details are as follows.

The grammar consists of three steps.

Preprocess the DRS. First, embodiments treat all constants as lexical elements and bind them to a variable c. For instance, in FIG. 1 embodiments bind 'speaker' to a variable c1 and change the relations AGENT($e_2$, 'speaker') and AGENT($e_2$, 'speaker') into AGENT($e_2$, $c_1$) and AGENT($e_2$, '$c_1$' respectively).

Second, embodiments deal with multiple lexical elements that map to the same variables (e.g. cat($x_1$)^entity($x_1$), where the second predicate specify the 'nature' of the first) by renaming the second variable as i and creating a dummy relation OF that maps from from the first to the second. Finally, embodiments get rid of relations that generate cycles. All these changes are then reverted before evaluation.

Converting the DRS into a DAG. Embodiments convert all main boxes, lexical predicates and constants (now bound to a variable) to nodes whereas binary relations between predicates and boxes are treated as edges. For each box, embodiments identify a head variable (if any) and attach this as child to the box node; in FIG. 5, these are $e_1$ and $e_2$ for $b_2$ and $b_3$ respectively. Embodiments then follow the relation to expand the graph. In doing so, embodiments also incorporate presuppositional boxes in the graph (i.e. $b_4$ in FIG. 5). Each of these boxes contain predicates that are presupposed in context (usually definite description like 'the door'). Once a presupposed variable is introduced in the graph, embodiments flag it with a superscript [p].

Convert the DAGs into derivation trees. Embodiments convert DAGs are converted into derivation trees in two passes following Algorithm 1: first, for each node n embodiments traverse the graph post-order and store information on the reentrant nodes in the subgraph rooted n. To be more precise, each outgoing edge ei from n defines a subgraph si along which embodiments extract a list of reentrant nodes that embodiments append to n.reentrants. This list also includes the node itself, if reentrant.

Embodiments then traverse the tree depth-first to collect the grammar fragments and build the derivation tree. Each node contains information of its variable (and type), lexical predicate and features as well as a list of the labels on outgoing edges that embodiments plug in the fragments. In order to add variable references, if any, embodiments determine whether there are any reentrant nodes that are shared across the subgraphs si . . . s|e|. If so, these become variable references. If the node n itself is reentrant, embodiments flag it with * so that embodiments know that its variable name can substitute a variable reference.

Embodiments use the pre-trained uncased multilingual BERT base model from Wolf et al. (2019). All models trained on English data, monolingual or multilingual, share the same hyper-parameter settings. Languages other than English in the PMB v3.0 have less training data, especially in the cases of Dutch and Italian. Hence, embodiments reduce the model capacity across the board and increase dropout to avoid over-fitting. Hyperparameter settings are shown in Table. 7 (FIG. 16); embodiments explore the following combinations: 256, 384, 512 for encoder hidden size; 1 or 2 layer for the encoder; 50, 75, 100 for embedding sizes.

Embodiments found fine-tuning BERT model necessary to achieve good performance. Embodiments experiment with different fine-tuning strategies, all applied after model performance plateaued. Here are three different fine-tuning strategies.

1. setting constant learning rate for BERT layers
2. gradually unfreezing BERT layer by layer with decaying learning rate
3. slanted-triangular learning rate scheduling.

Statistics regarding the grammars extracted from the PMB are presented in Table 1 above, where along with the number of training instances and fragments, embodiments report average rank—an indication of how many reentrancies (on average) are present in the graphs.

RDGs can be large especially in the case of silver data, where incorrect parses lead to a larger number of fragments extracted and more complex, noisy constructions, as attested by the higher average ranks. More importantly, embodiments show that removing the edge labels from the fragments leads to a drastic reduction in the number of fragments, especially for the silver corpora.

4.2 Evaluation Metrics

To evaluate the parser, embodiments compare its output DRSs to the gold-standard graph structures. For this, embodiments use the Counter tool of (Rik van Noord, Lasha Abzianidze, Antonio Toral, and Johan Bos. 2018. Exploring neural methods for parsing discourse representation structures. Transactions of the Association for Computational Linguistics, 6:619-633, "Van Noord et al. (2018)"), which calculates an F-score by searching for the best match between the variables of the predicted and the gold-standard graphs. Counter's search algorithm is similar to the evaluation system SMATCH for AMR parsing (Shu Cai and Kevin Knight. 2013, "Smatch: An evaluation metric for semantic feature structures. In Proceedings of the 51st Annual Meeting of the Association for Computational Linguistics," pages 748-752, "Cai and Knight, 2013").

5 Experimental Results

Embodiments first present results of ablation experiments to understand which model configuration performs best (§ 5.1). Embodiments then compare the best performing model with several existing semantic parsers (§ 5.2), and present the model's performance in multilingual settings (§ 5.3).

5.1 Ablation Experiments

|  | P | R | F1 |
| --- | --- | --- | --- |
| Baseline | 80.0 | 70.9 | 75.2 |
| +rank-prediction | 81.0 | 72.3 | 76.4 |
| +constrained-decoding | 80.5 | 75.2 | 77.8 |
| Edge-factorization | 82.5 | 78.5 | 80.4 |
| Ours-best + silver | 83.8 | 80.6 | 82.2 |
| Ours-best + filtering | 83.1 | 80.5 | 81.8 |

Table 2 (above) provides ablation results on the dev portion of PMB2q.2.0. The top half shows results for models trained on gold data only. The bottom half shows results of models trained on silver+gold data.

Table 2 shows results for the model in various settings. The baseline is trained on gold data alone, uses a full grammar and performs unconstrained decoding, with and without rank prediction. Note that unconstrained decoding could lead to ill-formed graphs. To better understand the effect of this, embodiments compare the performance of the baseline with a model that uses constrained decoding and thus always generates well-formed graphs. Embodiments train all the models on a single TItanX GPU v100. Embodiments state hyperparameters and other training details in the section above discussing FIG. 12.

The results are different from that of FA19, who show that a baseline model outperforms one with constrained decoding. Not only embodiments find that constrained decoding outperforms the baseline, but embodiments observe that without it, 26 graphs (←−4%) are ill-formed. In addition, the results show that predicting edge labels separately from fragments (edge factorization) leads to a substantial improvement in performance, while also drastically reducing the size of the grammar (as shown in Table 1). Embodiments also train the best-performing model (oursbest) on the silver and gold data combined (+silver).

This is to assess whether more data, albeit noisy, results in better performance. However, noisy data can lead to noisy grammar; to reduce this noise, embodiments experiment with first extracting a grammar from the gold training set, and use it to filter the silver set, where only instances that can be derived using the gold grammar are kept (+filtering). The filtering results in smaller grammar (232 vs. 2586 fragments), while at the same time sacrificing only a small percentage of training instances (10%). (Rik van Noord, Antonio Toral, and Johan Bos. 2019, Linguistic information in neural semantic parsing with multiple encoders. In Proceedings of the 13th International Conference on Computational Semantics-Short Papers, pages 24-31, "van Noord et al. (2019)") and (Jiangming Liu, Shay B Cohen, and Mirella Lapata, 2019, Discourse representation structure parsing with recurrent neural networks and the transformer model. In Proceedings of the IWCS Shared Task on Semantic Parsing, "Liu et al. (2019)") found that models trained on silver data requires an additional training fine-tuning on gold data alone to achieve the best performance; embodiments also follow this strategy in experiments. Overall, results show that adding silver data improves performance, and that filtering the input silver data leads only to a slight loss in performance while keeping the size of the grammar small.

5.2 Benefits of Approach Provided by this Application

Embodiments compare the best-performing model against previous work on PMB2.2.0. Embodiments first compare the performance on models trained solely on gold data. Besides the DAG-grammar parser of FA19, embodiments compare with the transition-based stackLSTM of Evang (2019) that utilizes a buffer-stack architecture to predict a DRS fragment for each input token using the alignment information in the PMB; the graph parser does not make use of such information and solely relies on attention.

Embodiments then compare the best-performing model with two models trained on gold plus silver data. van Noord et al. (2019) is a seq2seq parser that decodes an input sentence into a concatenation of clauses, essentially a flattened version of the boxes in FIG. 1. Similar to FA19, their model also uses a wide variety of language-dependent features, including part-of-speech, dependency and CCG tags, while the present disclosure relies solely on word embeddings. For background, see Liu et al. (2019)'s that uses the same architecture as the model of van Noord et al. (2019) but replaces the LSTM encoder with a transformer model, without the use of additional features.

TABLE 3

|  | P | R | F1 |
| --- | --- | --- | --- |
| Fancellu (2019) | — | — | 73.4 |
| Evang (2019) | — | — | 74.4 |
| Ours-best | 84.5 | 81.3 | 82.9 |
| Van Noord (2019) | — | — | 86.8 |
| Liu (2019) | 85.8 | 84.5 | 85.1 |
| Ours-best + silver | 86.1 | 83.6 | 84.9 |

Table 3 provides a comparison of previous work on the test portion of PMB2.2.0. Results in the top half are for models trained on gold data, whereas bottom half shows results for models trained on silver+gold data.

Results are summarized in Table 3. When trained on gold data alone, the model outperforms previous models by a large margin, without relying on alignment information or extra features besides word embeddings. When trained on silver+gold, embodiments close the performance gap with state-of-the-art models that decode into strings, despite relying solely on multilingual word embeddings.

5.3 Multilingual Experiments

|  | En | De | Nl | it |
| --- | --- | --- | --- | --- |
| FA19 (monolingual) | — | 67.9 | 65.8 | 75.9 |
| FA19 (cross-lingual) | — | 63.5 | 65.1 | 72.1 |
| Ours (cross-lingual) | — | 73.4 | 73.9 | 76.9 |
| Below, ours-best trained and tested on PMB3 | | | | |
| Monolingual | 80 | 64.2 | 60.9 | 71.5 |
| Cross-lingual | — | 73.2 | 74.1 | 75.2 |
| Bilingual | — | 71.8 | 76.0 | 77.7 |
| Polyglot | 79.8 | 72.5 | 74.1 | 77.9 |

In this application, "ours" refers to performance of embodiments disclosed herein.

Table 4 (above). In Table 4, results are provided for multilingual experiments on the test sets for PMB2.2.0 (top half) and PMB3.0 (bottom half).

Table 4 shows the results on languages other than English. In the multilingual experiments, embodiments first train and test monolingual models in each language. In addition, embodiments perform zero-shot experiments by training a model on English and testing it on other languages (cross-lingual). Embodiments also take full advantage of the fact that the models rely solely on multilingual word embeddings, and experiment with two other multilingual settings: The bilingual models are trained on data in English plus data in a target language (tested on the target language). The polyglot models combine training data of all four languages (tested on each language).

FA19 only experiment with a cross-lingual model trained with additional language-dependent features, some of which available only for a small number of languages (on PMB2.2.0). Embodiments therefore compare the cross-lingual models with theirs on PMB2.2.0. Embodiments then introduce the first results on PMB3, where embodiments experiment with the other two multilingual settings.

The results tell a different story from FA19, where all of the multilingual models (bilingual, polyglot and cross-lingual) outperform the corresponding monolingual baselines. Embodiments hypothesize this is mainly due to the fact that for languages other than English, only small silver training data are available and adding a large gold English data might help dramatically with performance. This hypothesis is also reinforced by the fact that a crosslingual model training on English data alone can reach a performance comparable to the other two models.

The system of this application interprets the meaning of an utterance as graph connecting an event with its participants and other proprieties time. The evaluation is done by comparing the graph that embodiments predicted with a human annotated correct graph in different languages. What embodiments show is that, compared to previous work, embodiments are able to reproduce the correct graph (which in turn represents the correct meaning of the sentence) with more fidelity compared to previous work and it also allows to do that in three languages other than English.

Specifically in this application, embodiments have disclosed a graph parser that uses DAG grammars in a seq2seq architecture. The present approach is efficient, fully multilingual, always guarantees well-formed graphs and can rely on small grammars, while outperforming previous graph-aware parsers in English, Italian, German and Dutch by large margin.

At the same time, embodiments close the gap between stringbased and RDG-based decoding. The techniques of this application are also applicable to other semantic formalisms (e.g. AMR, UCCA) as well as testing on other languages.

PMB—Data Statistics

TABLE 5

Data statistics for the PMB v.2.2.0 and 3.0 (g—gold; s—silver). Numbers in parentheses are the instances embodiments were able to extract a derivation tree for. Training instances for languages other than English are silver, whereas dev and test are gold.

| train | dev | test |
| --- | --- | --- |
| PMB2.2.0-g | 4597 (4585) | 682 | 650 |
| PMB2.2.0-s | 67965 (63960) | — | — |
| PMB3-g | 6620 (6618) | 885 | 898 |
| PMB3-s | 97598 (94776) | — | — |
| PMB3-it | 2772 (2743)* | 515 | 547 |
| PMB3-de | 5250 (5019)* | 417 | 403 |
| PMB-nl | 1301 (1238)* | 529 | 483 |

Supplemental Note 1

In some instances, the use of place holders includes producing a grammar by:

converting a first graph of a first grammar into a first sequence of first productions, wherein a first plurality of edge labels are associated with the first graph;

converting a second graph of the first grammar into a second sequence of second productions, wherein a second grammar comprises the first sequence of first productions and second sequence of second productions, wherein a second plurality of edge labels are associated with the second graph;

identifying a first placeholder as a first combination of two or more edges in the first sequence of first productions;

identifying a second placeholder as a second combination of two or more edges in the second sequence of second productions;

factorizing the first sequence of first productions into a first plurality of ordered placeholders to obtain a first reduced production, wherein the first plurality of ordered placeholders includes the first placeholder and the second placeholder;

factorizing the second sequence of second productions into a second plurality of ordered placeholders to obtain a second reduced production, wherein the second plurality of ordered placeholders includes the first placeholder and the second placeholder;

obtaining a third grammar comprising the first reduced production, the second reduced production, and a set representing the union of the first plurality of edge labels and the second plurality of edge labels;

receiving an encoded representation of an utterance;

decoding, using the third grammar, the encoded representation of the utterance to obtain a machine-readable graph; and providing the machine-readable graph to a machine for a machine action.

Supplemental Note 2

An apparatus configured to cause a machine action based on an utterance, the apparatus comprising:

a processor; and a memory, the memory containing instructions configured to cause the processor to:

factorize a plurality of productions, wherein the factorizing comprises replacing a plurality of edge labels in the plurality of productions with a plurality of placeholders, and wherein a grammar is defined by the plurality of productions and each respective production of plurality of productions corresponds to a respective one or more rules of a plurality of rules;

generate a graph from the utterance, by:

applying the plurality of rules to obtain a first graph based on the plurality of placeholders, wherein the first graph comprises a second plurality of placeholders, and iteratively replacing, by a neural network and based on a set of constraints, a first placeholder in the first graph with an edge label, until each placeholder of the second plurality of placeholders in the first graph has been replaced, thereby obtaining a second graph comprising a second plurality of edge labels and no placeholders.

Supplemental Note 3

The apparatus of claim Supplemental Note 2, wherein the iteratively replacing comprises substituting the first placeholder with two or more edge labels.

What is claimed is:

1. A method of causing a machine action based on an utterance, the method comprising:

receiving the utterance comprising a plurality of words;

associating a plurality of word embeddings with the plurality of words by applying a multilingual bidirectional encoder representations from transformers (mBERT) model to the plurality of words;

inputting the plurality of word embeddings to a first long short term memory (LSTM) layer and inputting an output of the first LSTM layer to a second LSTM layer to obtain a plurality of tokens, wherein the plurality of tokens includes a plurality of variable references;

decoding the plurality of tokens to obtain a machine-readable graph, by requiring a first number of re-entrant graph nodes, wherein the first number is determined by the plurality of variable references; and providing the machine-readable graph to a machine for the machine action;

wherein the decoding comprises:

obtaining a predicted fragment by inputting the plurality of tokens to a third LSTM layer; and obtaining a predicted label by inputting the predicted fragment to a fourth LSTM layer, wherein the predicted label includes a placeholder, wherein a placeholder is substitutable by any of a plurality of terminal symbols.

2. The method of claim 1, further comprising:

predicting an edge label to be substituted for the placeholder of the predicted label;

substituting the placeholder of the predicted label with the edge label to obtain a re-written fragment; and feeding back the re-written fragment as an input to the third LSTM layer.

3. The method of claim 1, wherein the obtaining the predicted fragment comprises:

concatenating a hidden state of the first layer with the embedding of a parent fragment and a context vector; and predicting logits of the fragment with a linear layer.

4. The method of claim 1, wherein the obtaining the predicted label comprises:

applying a linear transformation to the encoder representations to obtain a resulting vector;

concatenate the resulting vector with a label embedding matrix; and computing a dot product to obtain final unnormalized scores.

5. The method of claim 4, wherein the predicted label is a terminal label, the terminal label is either a lemma in plurality of words or a semantic constant, and wherein the method further comprises distinguishing between a lemma and a semantic constant by identifying a lemma from the input or by identifying token from a vocabulary of L.

6. The method of claim 1, wherein the machine action comprises scheduling, based on the machine-readable graph, a meeting between a first person and a second person.

7. The method of claim 1, further comprising training the grammar over a first plurality of utterances in a first language, wherein the utterance is in a second language different from the first language.

8. The method of claim 1, wherein the utterance comprises an answer spoken by a first person, and the machine action comprises recording the answer in a database.

9. An apparatus configured to cause a machine action based on an utterance, the apparatus comprising:
a processor; and
a memory, the memory containing instructions configured to cause the processor to:
receive the utterance comprising a plurality of words,
associate a plurality of word embeddings with the plurality of words by applying a multilingual bidirectional encoder representations from transformers (mBERT) model to the plurality of words,
input the plurality of word embeddings to a first long short term memory (LSTM) layer,
input an output of the first LSTM layer to a second LSTM layer to obtain a plurality of tokens, wherein the plurality of tokens includes a plurality of variable references, and
decode the plurality of tokens to obtain a machine-readable graph, by requiring a first number of re-entrant graph nodes, wherein the first number is determined by the plurality of variable references, and
provide the machine-readable graph to a machine for the machine action,
wherein the processor is further configured to:
obtain a predicted fragment by inputting the plurality of tokens to a third LSTM layer, and
obtain a predicted label by inputting the predicted fragment to a fourth LSTM layer, wherein the predicted label includes a placeholder, wherein a placeholder is substitutable by any of a plurality of terminal symbols.

10. The apparatus of claim 9, wherein the machine action comprises scheduling, based on the machine-readable graph, a meeting between a first person and a second person.

11. The apparatus of claim 9, wherein the instructions are further configured to cause the processor to train a grammar over a first plurality of utterances in a first language, wherein the utterance is in a second language different from the first language.

12. The apparatus of claim 9, wherein the utterance comprises an answer spoken by a first person, and the machine action comprises recording the answer in a database.

* * * * *